(12) United States Patent
Eldridge et al.

(10) Patent No.: US 11,332,056 B2
(45) Date of Patent: May 17, 2022

(54) SEAT COVER FASTENING CLIP

(71) Applicant: YKK CORPORATION, Tokyo (JP)

(72) Inventors: James Eldridge, Gray, GA (US); Kenji Dono, Macon, GA (US); Mingsi Wang, Macon, GA (US)

(73) Assignee: YKK Corporation

( * ) Notice: Subject to any disclaimer, the term of this patent is extended or adjusted under 35 U.S.C. 154(b) by 0 days.

(21) Appl. No.: 16/935,632

(22) Filed: Jul. 22, 2020

(65) Prior Publication Data

US 2021/0053472 A1 Feb. 25, 2021

Related U.S. Application Data

(60) Provisional application No. 62/890,403, filed on Aug. 22, 2019.

(51) Int. Cl.
  *B62D 65/14* (2006.01)
  *B60N 2/72* (2006.01)
  *F16B 21/07* (2006.01)

(52) U.S. Cl.
  CPC .............. *B60N 2/72* (2013.01); *B62D 65/14* (2013.01); *F16B 21/073* (2013.01)

(58) Field of Classification Search
  CPC .... F16B 21/073; F16B 5/0692; B60N 2/6027; B60N 2/5825; Y10T 24/44009; Y10T 24/4406; Y10T 24/44614; Y10T 24/44658; Y10T 24/44966
  See application file for complete search history.

(56) References Cited

U.S. PATENT DOCUMENTS

| 4,475,283 | A | * | 10/1984 | Olson | B25B 9/02 |
| | | | | | 29/278 |
| 5,638,624 | A | * | 6/1997 | Cornu | G09F 3/205 |
| | | | | | 24/456 |
| 5,666,865 | A | * | 9/1997 | Ito | H01H 85/0208 |
| | | | | | 29/278 |
| 7,384,086 | B2 | * | 6/2008 | Lukaszynski | H01H 85/0208 |
| | | | | | 29/278 |

(Continued)

FOREIGN PATENT DOCUMENTS

| DE | 10118105 | 10/2001 |
| FR | 2679895 | 11/1993 |

(Continued)

OTHER PUBLICATIONS

YKK Corporation; Notice of Reasons for Refusal for Japanese patent application No. 2020-135004, dated Aug. 3, 2021, 9 pgs.

*Primary Examiner* — Robert Sandy
(74) *Attorney, Agent, or Firm* — Taylor English Duma LLP

(57) ABSTRACT

A clip for securing a cover to an opening defined in a base includes a base defining a lower surface and an upper surface distal from the lower surface, the base further defining a cutout extending from the lower surface to the upper surface; a first wall extending from the upper surface of the base of the clip and defining a first latch nail at a distal end of the first wall; and a second wall extending from the upper surface of the base and defining a second latch nail at a distal end of the second wall, the first latch nail and the second latch nail defining a gap therebetween at the distal end of each of the first wall and the second wall, the cutout defined in the base between the first wall and the second wall.

9 Claims, 23 Drawing Sheets

(56) References Cited

U.S. PATENT DOCUMENTS

| | | | |
|---|---|---|---|
| 2008/0258523 A1 | 10/2008 | Pantin et al. | |
| 2012/0110797 A1 | 5/2012 | Santin et al. | |
| 2012/0174352 A1 | 7/2012 | Tsunoda | |
| 2013/0247338 A1 | 9/2013 | Santin et al. | |
| 2014/0352117 A1 | 12/2014 | Murasaki | |
| 2015/0135485 A1 | 5/2015 | Santin et al. | |
| 2016/0198811 A1* | 7/2016 | Mahe | B29C 45/44 24/444 |
| 2016/0280105 A1 | 9/2016 | Sato et al. | |

FOREIGN PATENT DOCUMENTS

| | | |
|---|---|---|
| JP | H11123665 | 5/1999 |
| JP | 2011069417 | 4/2011 |
| JP | 2012217754 | 11/2012 |
| JP | 2014097411 | 5/2014 |
| JP | 2016186324 | 10/2016 |
| WO | 2013069114 | 5/2013 |

\* cited by examiner

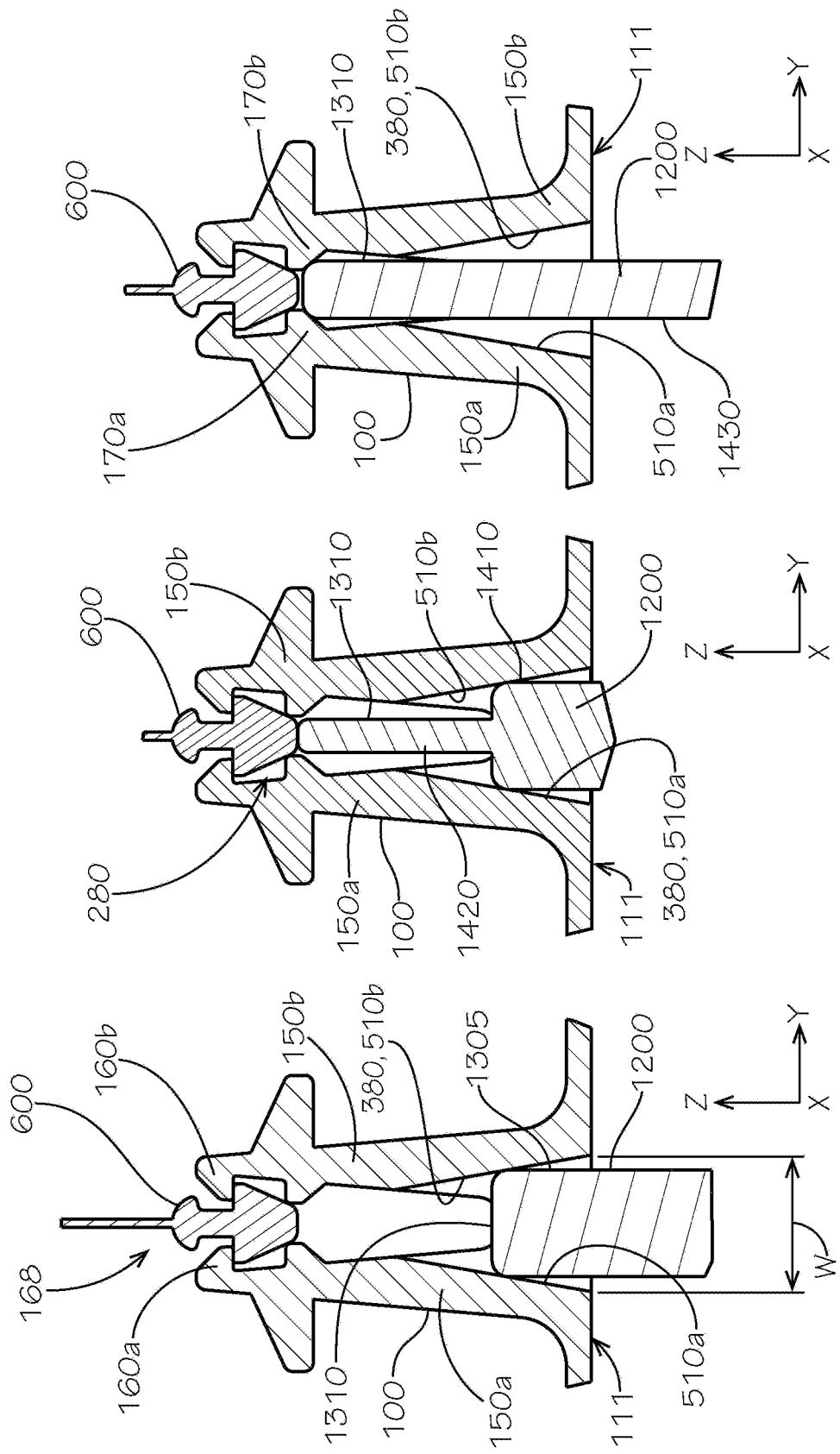

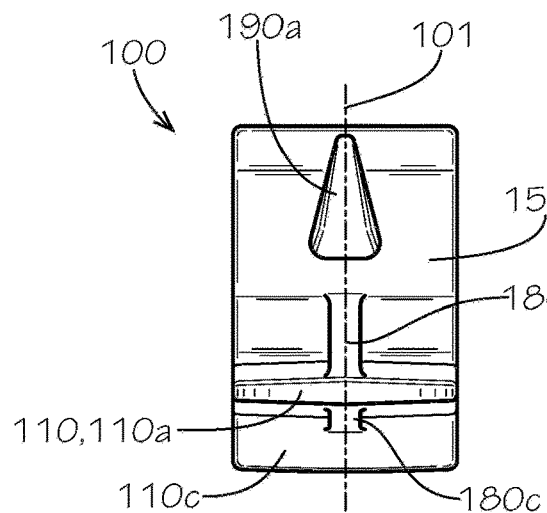 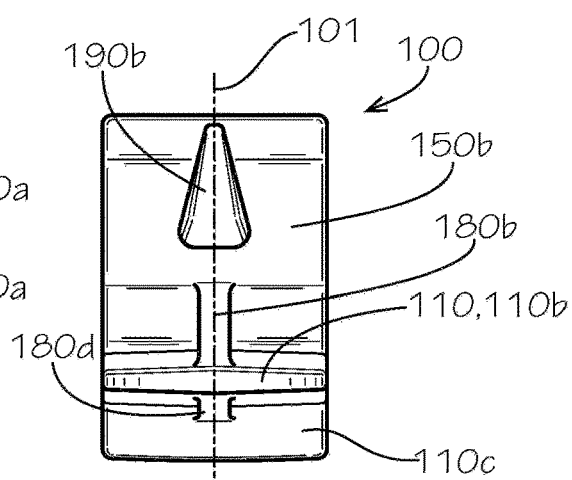
FIG. 18C  FIG. 18D
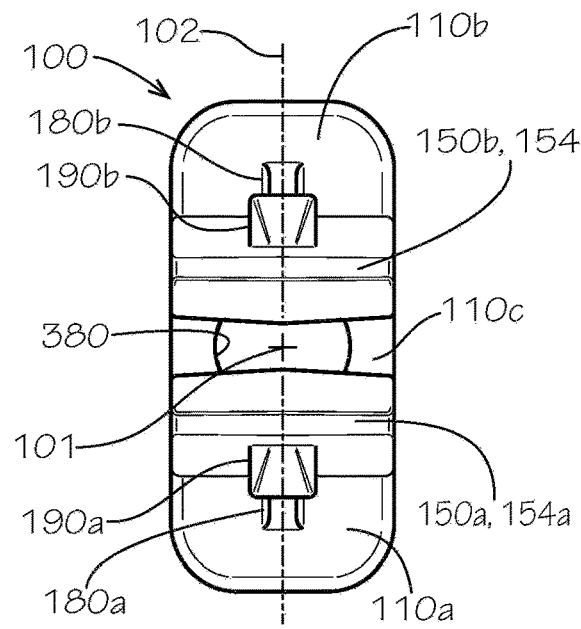 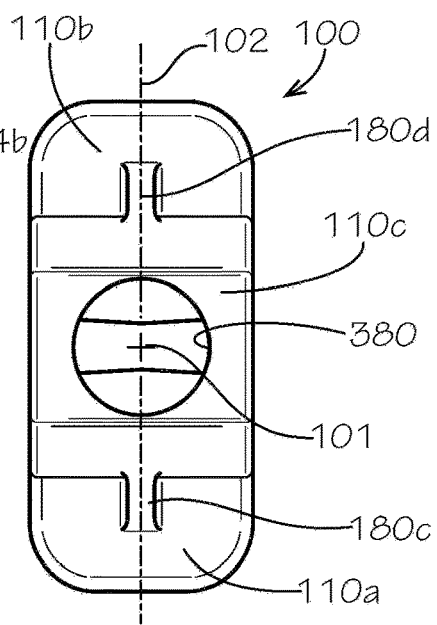
FIG. 18E  FIG. 18F
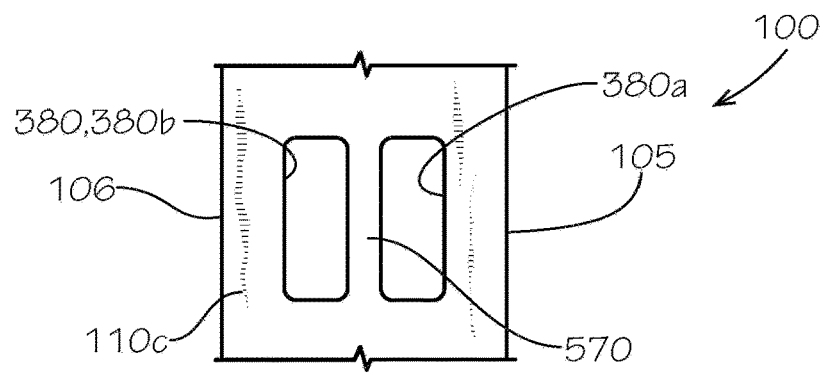
FIG. 18G

SEAT COVER FASTENING CLIP

REFERENCE TO RELATED APPLICATIONS

This application claims the benefit of U.S. Provisional Application No. 62/890,403, filed Aug. 22, 2019, which is hereby specifically incorporated by reference herein in its entirety.

TECHNICAL FIELD

Field of Use

This disclosure relates to fasteners. More specifically, this disclosure relates to fastening clips for vehicle upholstery.

Related Art

Many vehicles include seating for drivers or passengers or both or include upholstered surfaces incorporating a separate base, which can be a cushion, and a cover. While some vehicles have seating that does not require the separate base or an upholstery cover, many vehicles include both for comfort, aesthetics, and for other reasons. A manufacturer will typically use some kind of fasteners to secure upholstery—whether fabric, leather, or some other material—in place around the base. Some fastening methods involve the use of wires or other fasteners embedded inside foam cushions. Some bases using other materials and manufacturing methods can require new assembly methods and even new fasteners.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a clip for securing a cover to a base, the clip comprising: a base defining a lower surface and an upper surface distal from the lower surface; a first wall extending from the upper surface of the base and defining a first latch nail at a distal end of the first wall; and a second wall extending from the upper surface of the base and defining a second latch nail at a distal end of the second wall, the first latch nail and the second latch nail defining a gap therebetween at the distal end of each of the first wall and the second wall.

In a further aspect, disclosed is an assembly comprising: a base defining an opening; a cover comprising: a panel; and a suspender secured to the panel; and a clip comprising: a base; a first wall extending from the base of the clip and defining a first latch nail at a distal end of the first wall; and a second wall extending from the base of the clip and defining a second latch nail at a distal end of the second wall, the first latch nail and the second latch nail defining a gap therebetween at the distal end of each of the first wall and the second wall and holding captive a portion of the suspender therebetween.

In yet another aspect, disclosed is a method of assembly comprising: obtaining a base, the base defining a lower surface and an upper surface and a plurality of openings extending from the lower surface to the upper surface; inserting a clip through one of the plurality of openings, the clip comprising: a base; a first wall extending from the base of the clip and defining a first latch nail at a distal end of the first wall; and a second wall extending from the base of the clip and defining a second latch nail at a distal end of the second wall, the first latch nail and the second latch nail defining a gap therebetween at the distal end of each of the first wall and the second wall; and inserting a suspender into the gap of the clip defined by the first latch nail and the second latch nail.

In yet another aspect, disclosed is a method of removing a suspender of an assembly from a clip of the assembly, the method comprising: providing the clip of the assembly, the clip comprising a first wall and a second wall, the first wall extending from the base and defining a first latch nail at a distal end of the first wall; and the second wall extending from the base and defining a second latch nail at a distal end of the second wall, the first latch nail and the second latch nail defining a gap therebetween at the distal end of each of the first wall and the second wall; spreading apart the first wall and the second wall to increase the size of the gap therebetween; and removing the suspender from the clip.

In yet another aspect, disclosed is a clip for securing a cover to an opening defined in a base, the clip comprising: a base defining a lower surface and an upper surface distal from the lower surface, the base further defining a cutout extending from the lower surface to the upper surface; a first wall extending from the upper surface of the base of the clip and defining a first latch nail at a distal end of the first wall; and a second wall extending from the upper surface of the base and defining a second latch nail at a distal end of the second wall, the first latch nail and the second latch nail defining a gap therebetween at the distal end of each of the first wall and the second wall, the cutout defined in the base between the first wall and the second wall.

In yet another aspect, disclosed is an assembly comprising: a base defining an opening; a cover comprising: a panel; and a suspender secured to the panel; and a clip joining the cover to the base, the clip extending through the opening defined in the base of the assembly and comprising: a base; a first wall extending from the base of the clip and defining a first latch nail at a distal end of the first wall; and a second wall extending from the base of the clip and defining a second latch nail at a distal end of the second wall, the first latch nail and the second latch nail defining a gap therebetween at the distal end of each of the first wall and the second wall and holding captive a portion of the suspender therebetween, a gap of the clip configured to expand sufficiently to allow removal of the suspender upon insertion of a removal tool between the first wall and the second wall.

In yet another aspect, disclosed is a method of assembly comprising: obtaining a base, the base defining a lower surface and an upper surface and a plurality of openings extending from the lower surface to the upper surface; inserting a clip through one of the plurality of openings, the clip comprising: a base; a first wall extending from the base of the clip and defining a first latch nail at a distal end of the first wall; and a second wall extending from the base of the clip and defining a second latch nail at a distal end of the second wall, the first latch nail and the second latch nail defining a gap therebetween at the distal end of each of the first wall and the second wall, a gap of the clip configured to expand sufficiently to allow removal of the suspender upon insertion of a removal tool between the first wall and the second wall; and inserting a suspender into the gap of the clip defined by the first latch nail and the second latch nail.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 13 is a partial sectional view of the clip, the suspender, and the removal tool of FIG. 12 taken along line 13-13 of FIG. 12.

FIG. 14 is a partial sectional view of the clip, the suspender, and the removal tool of FIG. 12 taken along line 13-13 of FIG. 12 in accordance with another aspect of the current disclosure.

FIG. 15 is a partial sectional view of the clip, the suspender, and the removal tool of FIG. 12 taken along line 13-13 of FIG. 12 in accordance with another aspect of the current disclosure.

FIG. 18C is a first side view of the clip of FIG. 18A.

FIG. 18D is a second side view of the clip of FIG. 18A.

FIG. 18E is a top plan view of the clip of FIG. 18A.

FIG. 18F is a bottom plan view of the clip of FIG. 18A.

FIG. 18G is a bottom plan view of a base member of the clip of FIG. 18A showing cutouts defined by the base member.

DETAILED DESCRIPTION

Figure 1:
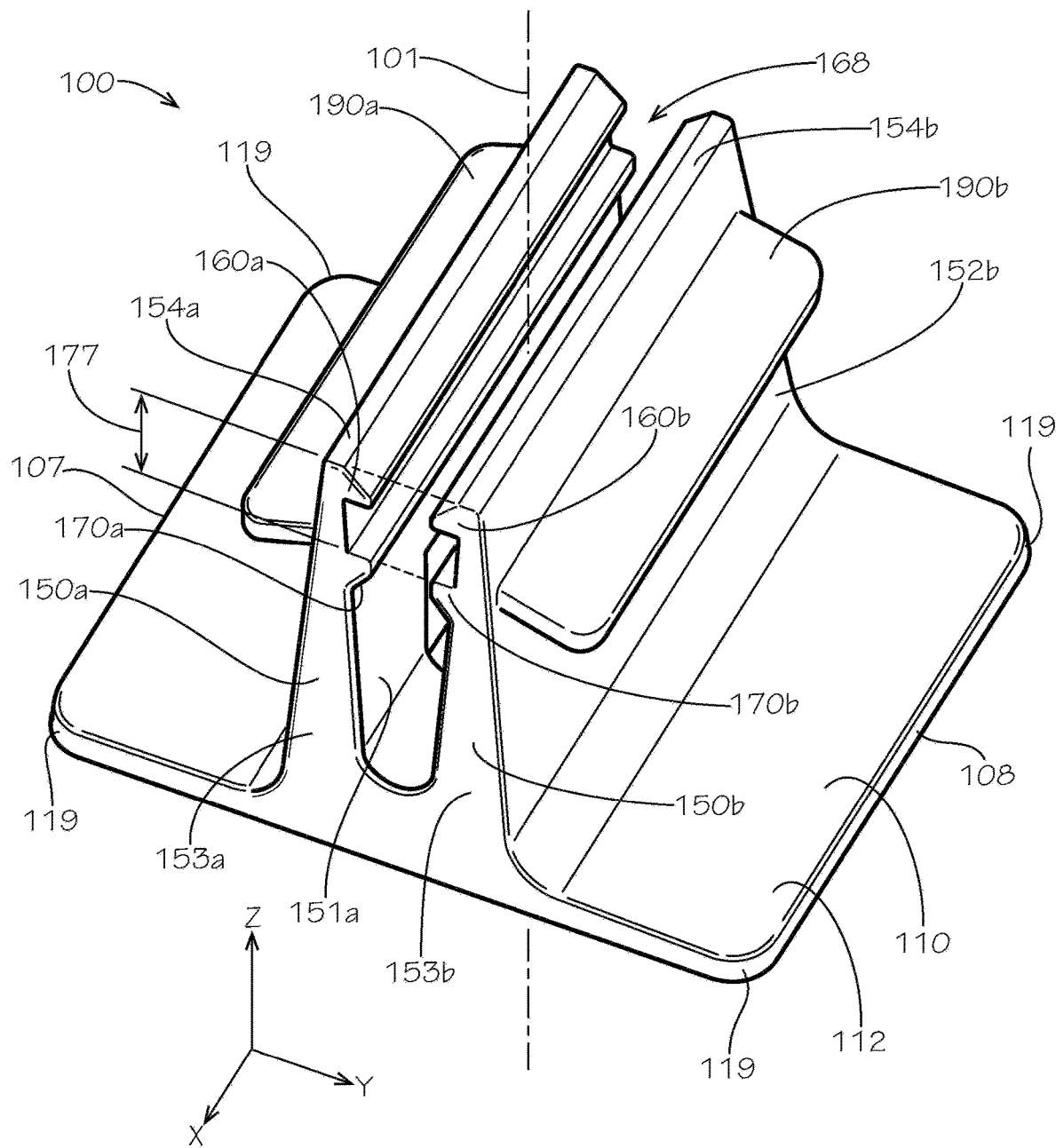
FIG. 1 is a top perspective view of a clip in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

A cover fastening clip 100 is described below on the basis of a coordinate axis of X-Y-Z directions shown in the figures. An X-axis direction can be referred to as a left-right or horizontal direction. For example, as shown in FIG. 1, the X-axis direction coincides with an extension direction of a suspender 600 (shown in FIG. 6) disposed in a suspender retention cavity 280 of the clip 100 (shown together in FIG. 6).

A Y-axis direction is orthogonal to the X-axis direction (left-right direction) and a Z-axis direction (upper-lower direction) and can also be referred to as a front-rear direction or a transverse direction or a length direction of the clip 100 from a first side end 107 (shown in FIG. 1) to a second side end 108 (shown in FIG. 1). A surface of a structural element that is parallel with the front-rear direction can be referred to as a lateral side.

An upper-lower direction is the Z-axis direction, which is orthogonal to the X-axis direction and to the Y-axis direction and typically coincides with a height of the clip 100. For example, a direction along which the suspender 600 can be inserted into a gap 168 of the clip 100 and locked into the clip 100 can be referred to as the Z-axis direction. Also, the upper-lower direction can coincide with a direction perpendicular to a surface of the cover 1010 (shown in FIG. 10) stretched on, over, or across a base 900 (shown in FIG. 9).

In one aspect, a seat cover fastening clip and associated methods, systems, devices, and various apparatuses are disclosed herein. In one aspect, the clip can comprise a base and a pair of walls.

FIG. 1 is a top perspective view of the clip 100 in accordance with one aspect of the current disclosure. As shown, the clip 100 can comprise a base 110 and a pair of walls 150a,b. The base 110 can also be a mount, a foot, a platform, or a bottom of the clip 100. The base 110 can define a lower surface 111 (shown in FIG. 2) and an upper surface 112 distal from the lower surface 111. In some aspects, the base 110 can be solid as shown. In other aspects, as will be described below, the base 110 can define one or more holes or cavities (as shown, for example and without limitation, in FIG. 17B)—to save on cost and weight or to provide other benefits. One or more corners 119 of the base 110 can define an edge relief such as, for example and without limitation, a radius or a chamfer. A geometric center of the base 110 can define a centerline axis 101 in the Z-axis direction.

Figure 2:
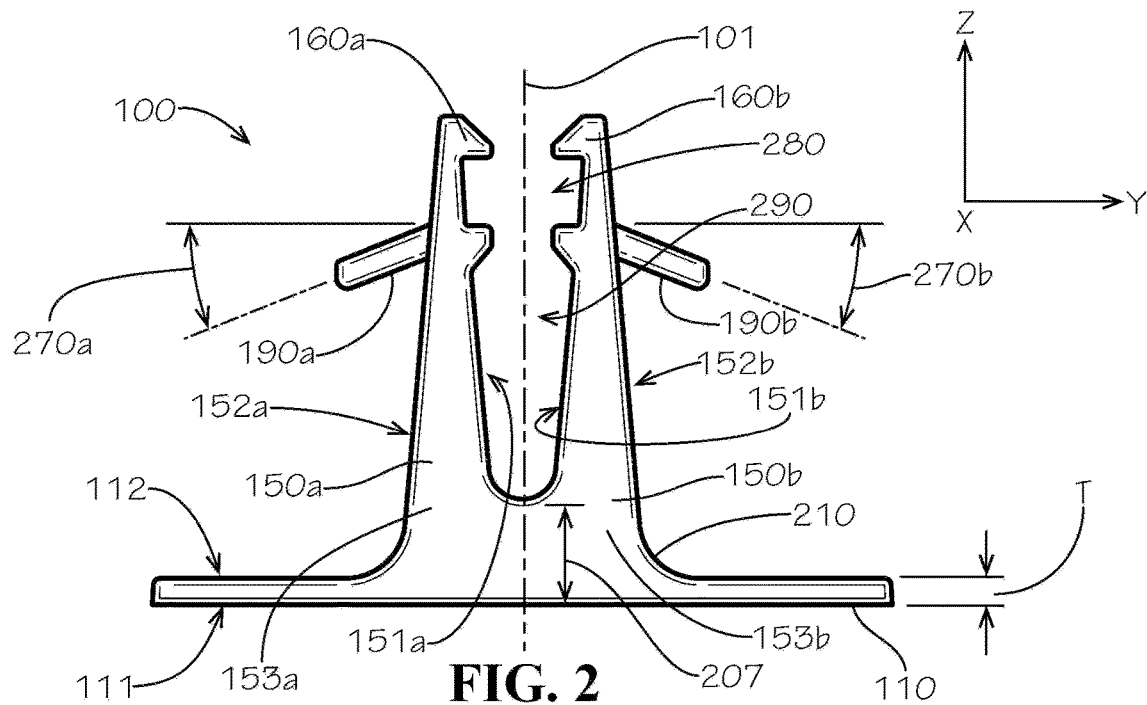
FIG. 2 is an end view of the clip of FIG. 1.

The pair of walls 150a,b can extend from the base 110 and define inner surfaces 151a,b (151b shown in FIG. 2) and outer surfaces 152a,b (152a shown in FIG. 2). Each of the first wall 150a and the second wall 150b can extend from the upper surface 112 of the base 110. Each of the walls 150a,b can define a respective proximal end 153a,b, which can be proximate to the base 110, and a respective distal end 154a,b. Each of the walls 150a,b can further define a respective hook or latch nail 160a,b at the corresponding distal end 154a,b. The first latch nail 160a and the second latch nail 160b can define a gap 168 therebetween. Each of the walls 150a,b can further define a respective guide rail 170a,b at a position offset from the corresponding distal end 154a,b towards the proximal end 153a,b. This position can define an offset distance 177, which can be driven by factors mentioned below and useful for reasons described below. The latch nails 160a,b and the guide rails 170a,b can extend from the respective inner surfaces 151a,b. A fin 190a,b on each of the respective walls 150a,b can extend from the respective outer surface 152a,b. In some aspects, as shown, each of the fins 190a,b can define a width 197 (shown in FIG. 3) in the X-axis direction less than an overall width of the base members 110a,b and the walls 150a,b in the same direction. In other aspects, two or more of the aforementioned elements can define the same width. In some aspects, the clip 100 can comprise no fins, one fin 190a,b, or more than two fins 190a,b.

FIG. 2 is an end view of the clip 100. As shown, the base 110 can define a constant thickness T throughout except proximate to the walls 150a,b. In some aspects, as shown, the fins 190a,b can be angled downward from a horizontal or Y-axis direction at angles 270a,b. The pair of walls 150a,b, including any portions thereof, can together define a suspender retention cavity 280 and expansion cavity 290. As shown, the proximal ends 153a,b of the walls 150a,b can intersect the upper surface 112 of the base 110 at the outer surfaces 152a,b and yet a portion of the walls 150a,b or at least the proximal ends 153a,b can be offset from the upper surface 112 at the inner surfaces 151a,b by an offset distance 207. An intersection between the base 110 and the walls 150a,b can define a transition 210, which can be a fillet or chamfer sized to reduce stresses that may develop upon outward flexing of the walls 150a,b, as will be described.

Figure 3:
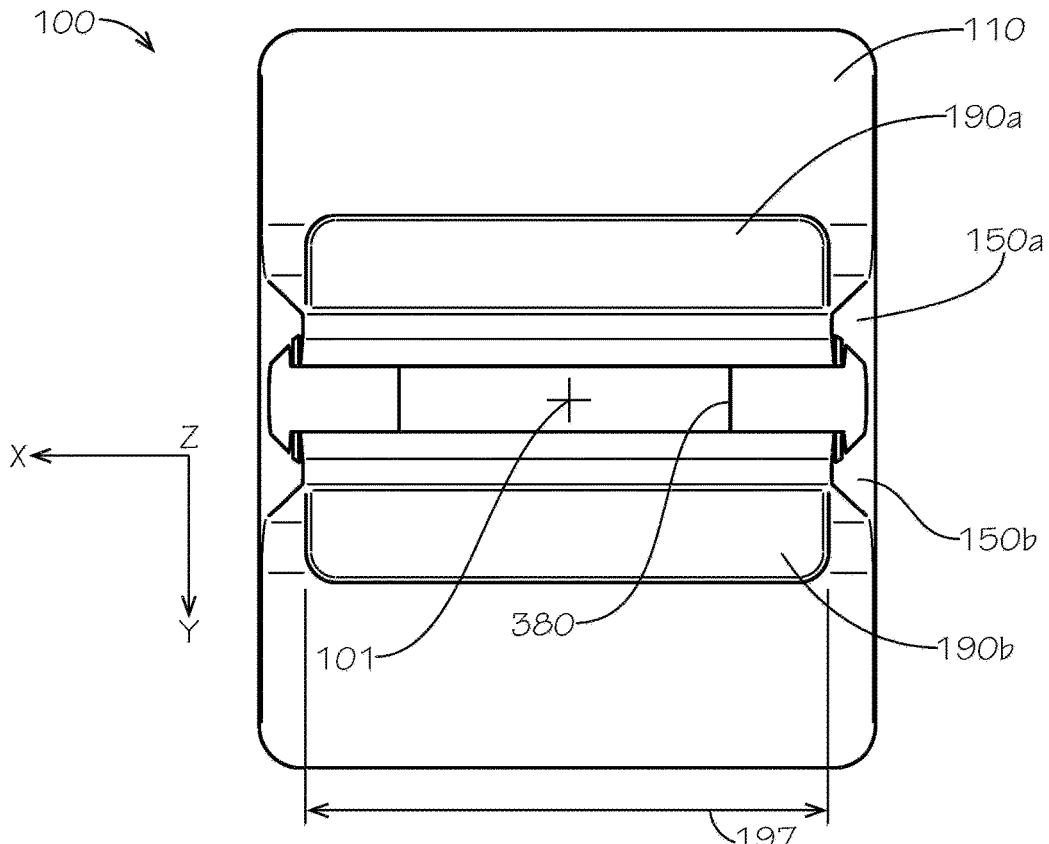
FIG. 3 is a top plan view of the clip of FIG. 1.

FIG. 3 is a top plan view of the clip 100. In some aspects, the base 110 when viewed from above or below (as in FIG. 5) can be rectangular as shown. In other aspects, the base 110 can have a non-rectangular shape such as, for example, that of a circle (not shown) or any other shape to maximize stability (by preventing rotation of the clip 100) while minimizing material use. As shown, the clip 100 can define a cutout 380 extending from the lower surface 111 (shown in FIG. 5) through the base 110 at a position between the first wall 150a and the second wall 150b. In some aspects, as shown, the cutout 380 can be a through-hole or otherwise define a closed shape. In other aspects, the cutout 380 can be a notch or otherwise define an open shape. In some aspects, as shown, the cutout 380 can define a rectangular shape. In other aspects, the cutout 380 can define a non-rectangular shape of any size and can be configured to receive a tool such as a removal tool 1200 (shown in FIG. 12) therethrough. To facilitate engagement of the removal tool 1200 with the walls 150a,b, a portion of one of the first wall 150a and the second wall 150b can cross a plane defined by an edge of the cutout 380 and extending in a direction parallel to the axis 101 or axis of the cutout 380 of the clip 100. As shown, the cutout 380 can be defined between the first end 105 and the second end 106 of the clip without defining either of the first end 105 or the second end 106. Again, each of the fins 190a,b can define the width 197.

Figure 4:
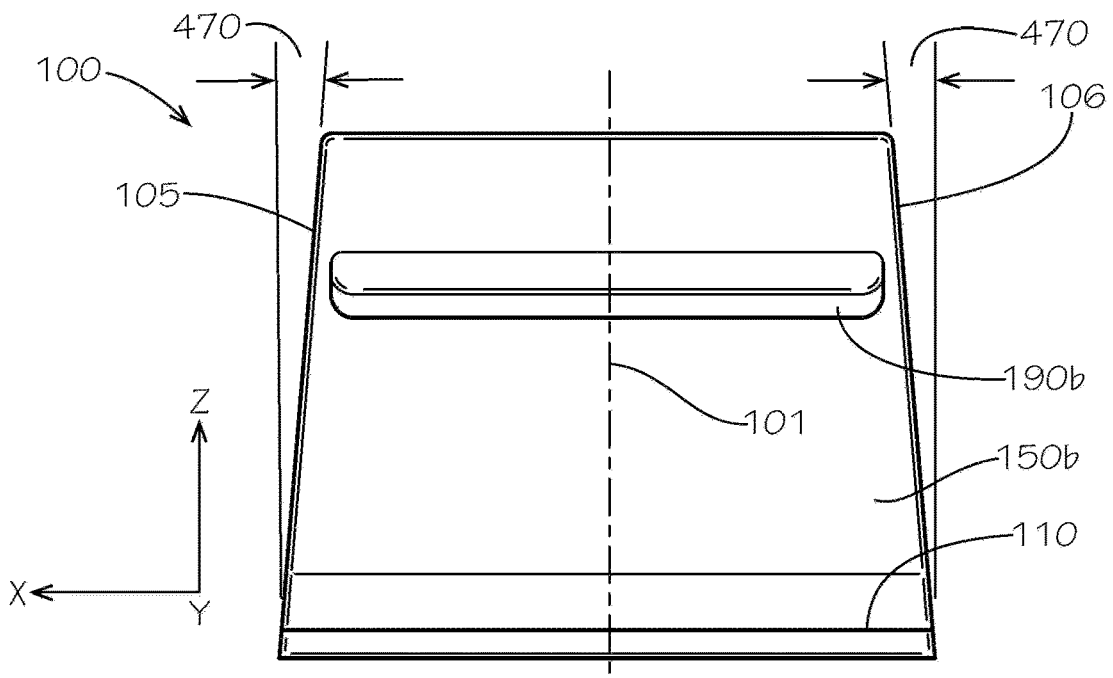
FIG. 4 is a side view of the clip of FIG. 1.

FIG. 4 is a side view of the clip 100. As shown, each of a first end 105 and a second end 106 can be angled or sloped inward towards the centerline axis 101 by an angle 470. While shown as symmetric about the centerline axis 101, the clip 100 can, in some aspects, instead be asymmetric when viewed from one or more directions. The clip 100 can define tapered or drafted surfaces in one or more of the X-axis, Y-axis, or Z-axis directions to facilitate manufacturing such as by a process of injection molding of the clip 100, which can be aided by the incorporation of draft angles.

Figure 5:
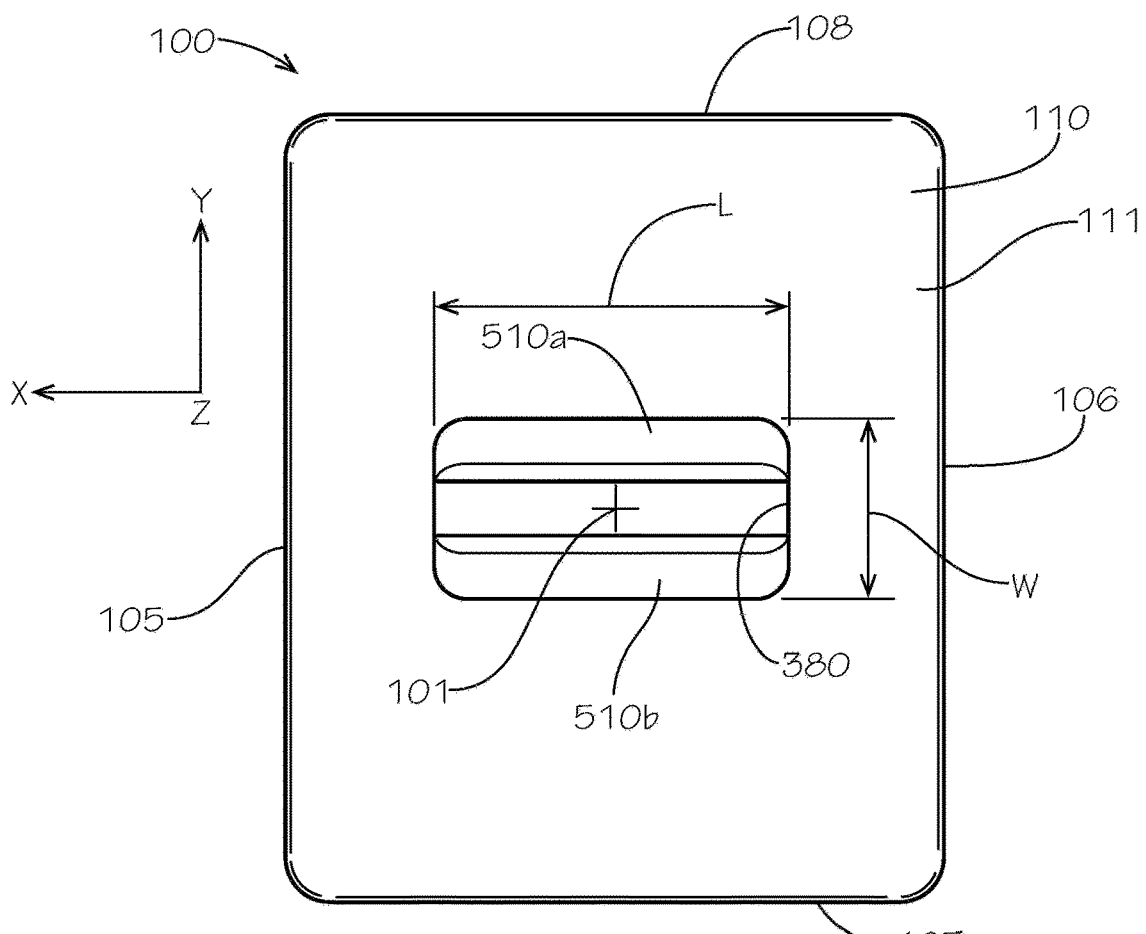
FIG. 5 is a bottom plan view of the clip of FIG. 1.

FIG. 5 is a bottom plan view of the clip 100. The base 110 and the clip 100 overall can further define the first side end 107 and the second side end 108, each of which can extend from the first end 105 to the second end 106. As shown, the cutout 380 can define a length L in the X-axis direction and a width W in the Y-axis direction. The clip 100 can define cutout side walls 510a,b, which can themselves optionally be angled with respect to the centerline axis 101. Including in such aspects, the cutout 380 can be tapered, as can the walls 150a,b at portions of the walls 150a, b in which the cutout 380 is defined. As such, the width W of the cutout 380 in the Y-axis direction can be wider proximate to the lower surface 111 than at a position offset from the lower surface 111 in the Z-axis direction.

Figure 6:
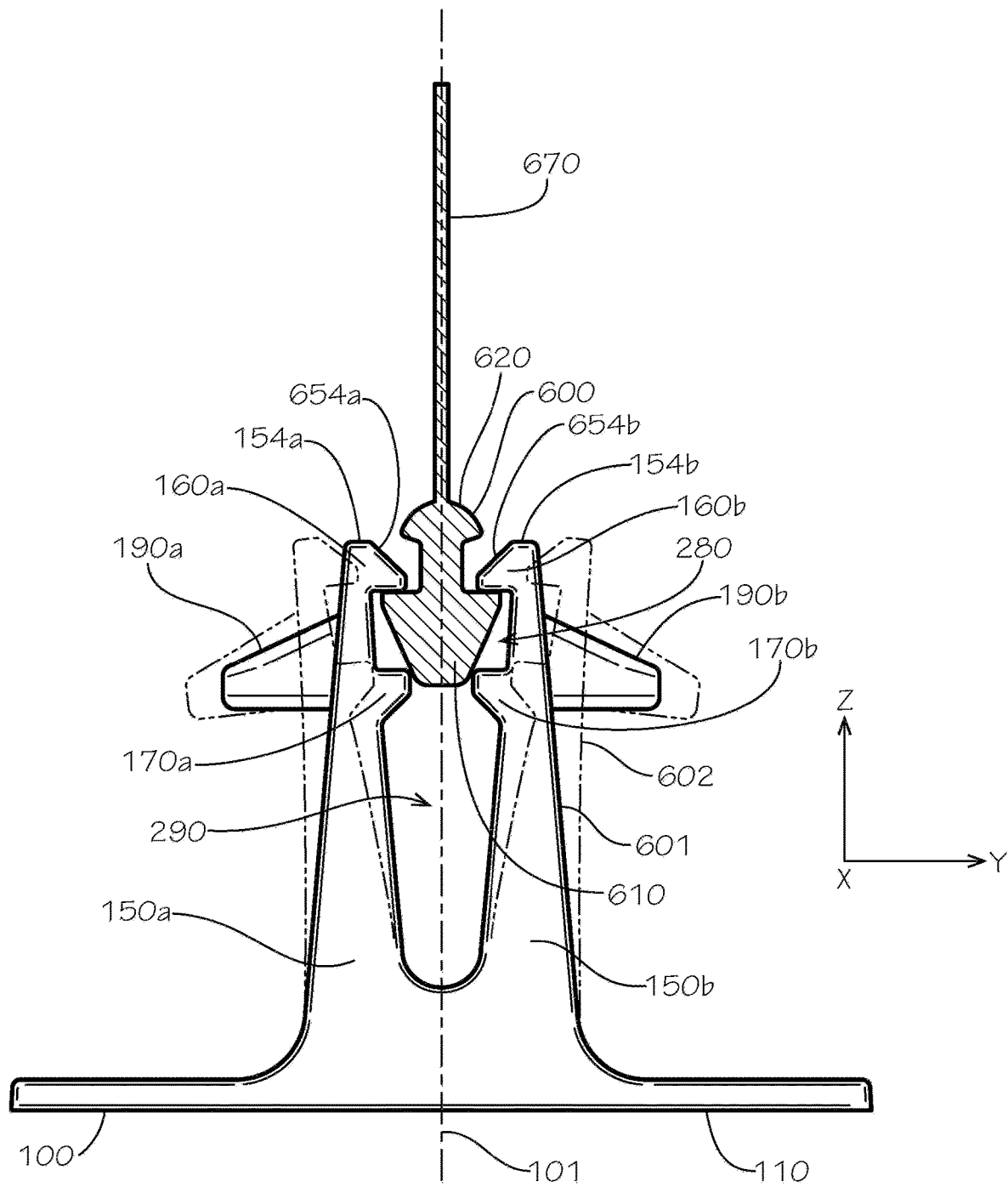
FIG. 6 is an end view of the clip of FIG. 1 with a suspender assembled therein and showing both flexed and non-flexed conditions of the clip.

FIG. 6 is an end view of the clip 100 with a suspender 600 assembled therein, which can be, for example and without limitation, a suspender like that available as part of an EZ-CLIP® fastening product from YKK Corporation. The clip 100 can flex or deform between a non-flexed condition (the shape 601 formed by solid lines) and a flexed condition (the shape 602 formed by phantom lines). This flexing can occur due to outward forces exerted by the suspender 600 on the distal ends 154a,b of the walls 150a,b of the clip 100 able to open up or increase a size of the gap 168 (shown in FIG. 1). A tapered body 610 of the suspender 600 and side surfaces defined thereby can push against the tapered latch nails 160a,b and specifically against entrance surfaces 654a,b of the respective latch nails 160a,b. As shown, the body 610 of the suspender 600 can be received within the suspender retention cavity 280 and out of the expansion cavity 290 but kept in contact with the latch nails 160a,b by the guide rails 170a,b. A flange 620 of the suspender can ease insertion of the suspender 600 into the clip 100 by providing a surface on either side of a tape 670 of the suspender 600 against which one can more easily push the suspender 600. As discussed below, an installation tool 2200 (shown in FIG. 22)—which can be an insertion tool—can facilitate installation of the suspender 600 in the clip 100. As shown, each of the fins 190a,b can be tapered in an outward direction with respect to the centerline axis 101. More specifically, as shown, a bottom side of each of the fins 190a,b can be horizontal with the clip 100 in the unflexed condition, while in the same condition a top side of each of the fins 190a,b can be angled. The degree of flexing shown in FIG. 6 can be considered exaggerated in that it is shown greater than necessary for the suspender 600 to pass through the gap 168 into the suspender retention cavity 280.

Figure 7:
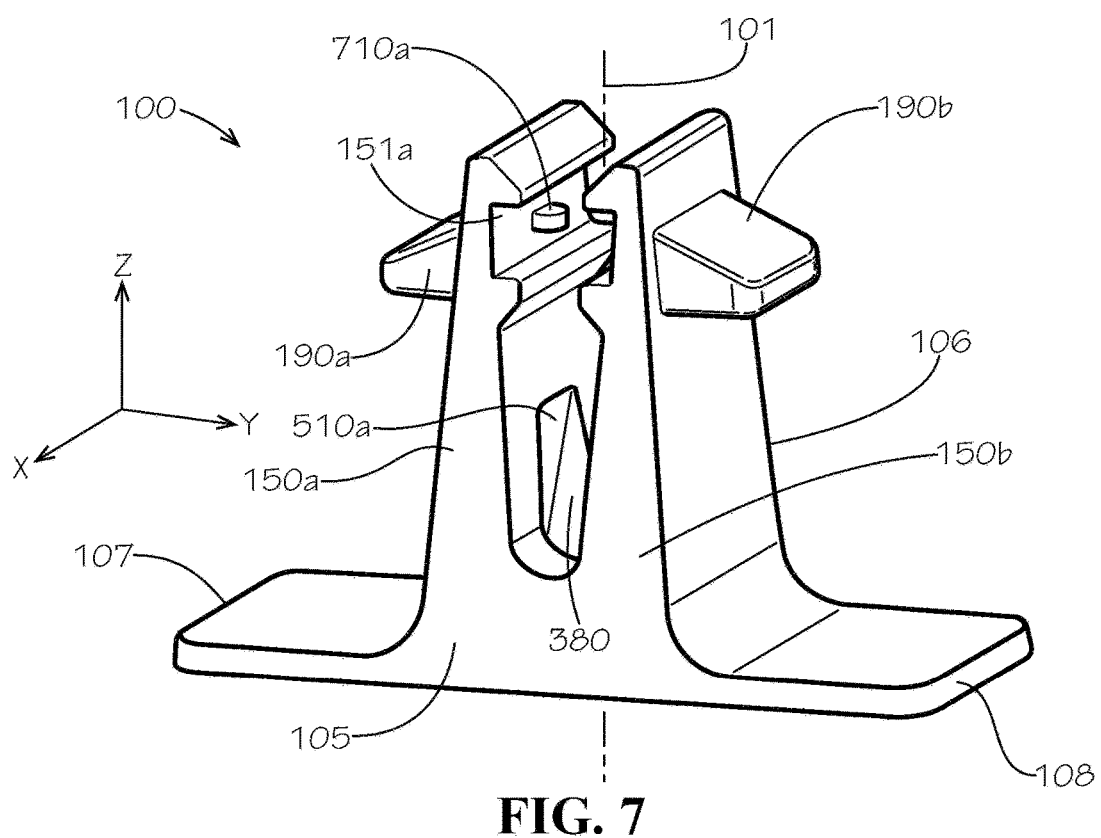
FIG. 7 is a top perspective view of the clip in accordance with another aspect of the current disclosure.

FIG. 7 is a top perspective view of clip 100 in accordance with another aspect of the current disclosure. Specifically, a tab 710a (and an opposing tab not shown) can extend from each of the inner surfaces 151a,b—or either one of the inner surfaces 151a,b—and can be sized and otherwise configured to engage any one of a plurality of recessed portions 810 (shown in FIG. 8 on a second side of the suspender 600, although recessed portions can similarly be defined in a first side of the suspender 600) of the suspender 600. As shown, in comparison with the clip 100 shown in previous figures, a width of the clip 100 as measured in the X-axis direction from the first end 105 to the second end 106 can be less—even much less—than a width measured from the first side end 107 to the second side end 108.

Figure 8:
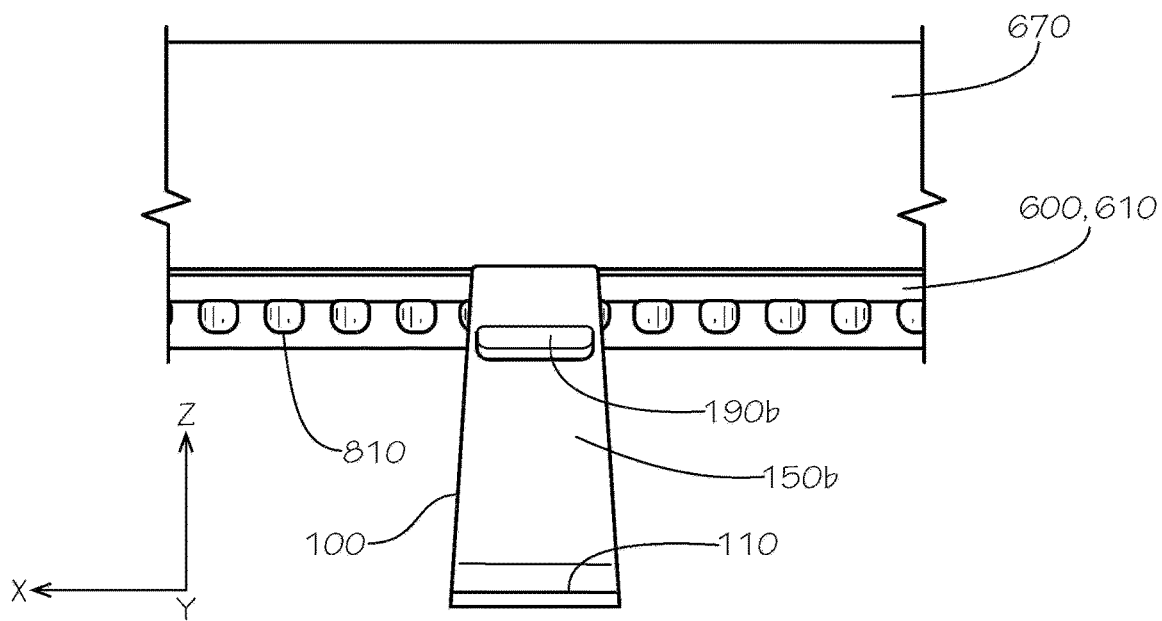
FIG. 8 is a side view of the clip and suspender assembly of FIG. 6.

FIG. 8 is a side view of an assembly of the clip 100 and suspender 600 showing the suspender 600 optionally locked in the X-axis direction with aforementioned tabs such as the tab 710a (shown in FIG. 7) and locked in the Z-axis direction inside the suspender retention cavity 280. Because any one of a plurality of the recessed portions 810 in the body 610 can be engaged with aforementioned tabs such as the tab 710a, in some aspects the lateral position of the suspender 600 in the clip 100 can be adjusted as desired in the X-axis direction before full engagement in the Z-axis direction but then, in any case, can be locked in a desired position in any or all of the X-axis, Y-axis, and Z-axis directions.

Figure 9:
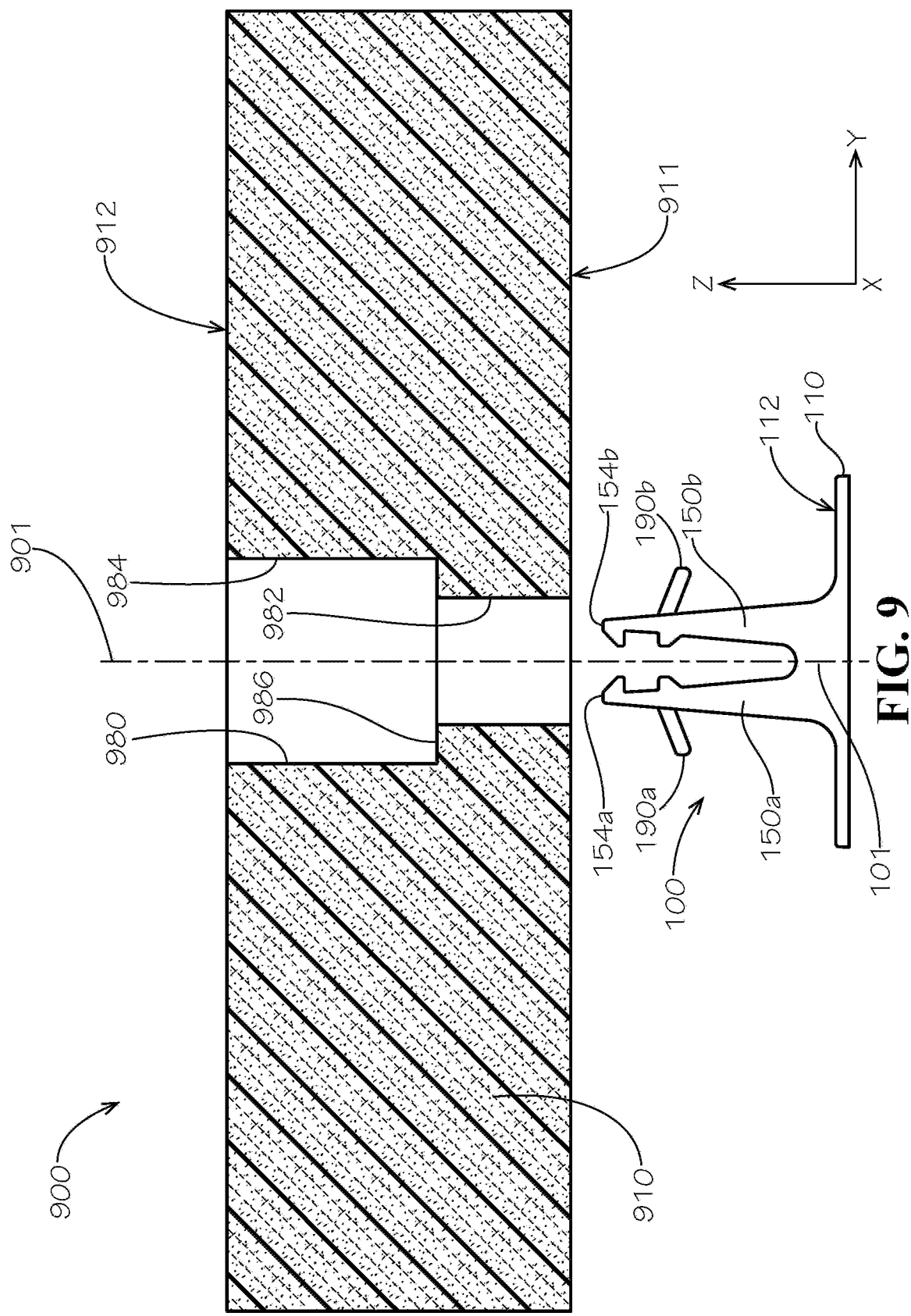
FIG. 9 is a partial sectional end view of the clip of FIG. 1 and a base before installation of the clip into the base in accordance with one aspect of the current disclosure.

FIG. 9 is a partial sectional end view of the clip 100 and a representation of a portion of the base 900, which can be, for example and without limitation, a seat cushion such as a seat bottom cushion of a vehicle seat (not shown) or a seat back cushion of the vehicle seat, before installation of the clip 100 into the base 900 in accordance with one aspect of the current disclosure. The base 900 can comprise a body 910 defining a lower surface 911 and an upper surface 912 and further defining a plurality of openings 980 extending from the lower surface 911 to the upper surface 912.

In some aspects, the opening 980 can be a cutout or hole, which can be formed by, for example, the removal or deformation (by heat, by mechanical force, or by other methods) of the material of the base 900. In other aspects, the opening 980 can be a slit, which can be formed by cutting (by, for example and without limitation, mechanical shearing and/or liquid or gas energy) through the material of the base 900 to allow passage of the clip 100 by, for example, displacement of the material of the base 900 surrounding the opening 980. The slit can define a one-dimensional opening (a pin-hole, for example, the formation of which need not involve the removal of any material of the base 900 but can form an opening having only a single dimension through a thickness of the material), a two-dimensional opening (for example, defining a dimension through the thickness of the material as well as a dimension across the material), or a three-dimensional opening (where, for example, at least in part the opening has both a length and a width across the material in addition to defining a dimension through a thickness of the material). The opening 980 can define any shape or size.

In some aspects, as shown, a lower portion 982 of each opening 980 defined in the lower surface 911 of the base 900 can have a smaller width or diameter than an upper portion 984 of the same opening 980 defined in the upper surface 912. In various aspects, the lower portion 982 of the opening 980 can be square or circular or some other shape to accommodate one shape or another of the clip 100. In any case, the variation between the lower portion 982 and the upper portion 984 of the opening 980 can provide a shoulder surface 986 against which the fins 190a,b of the clip 100 can catch and hold and thereby positively maintain the position of the clip 100 after assembly. In some aspects, the upper portion 984 can be a trench extending between multiple openings 980 and can allow an extended length of the suspender 600 to be received therein. As shown, the centerline axis 101 of the clip 100 can be aligned with an opening centerline 901 of the opening 980. The clip 100 can be positioned relative to the base 900 such that the distal ends 154a,b of the walls 150a,b and the upper surface 112 of the base 110 of the clip 100 are facing the lower surface 911 of the base 900.

Figure 10:
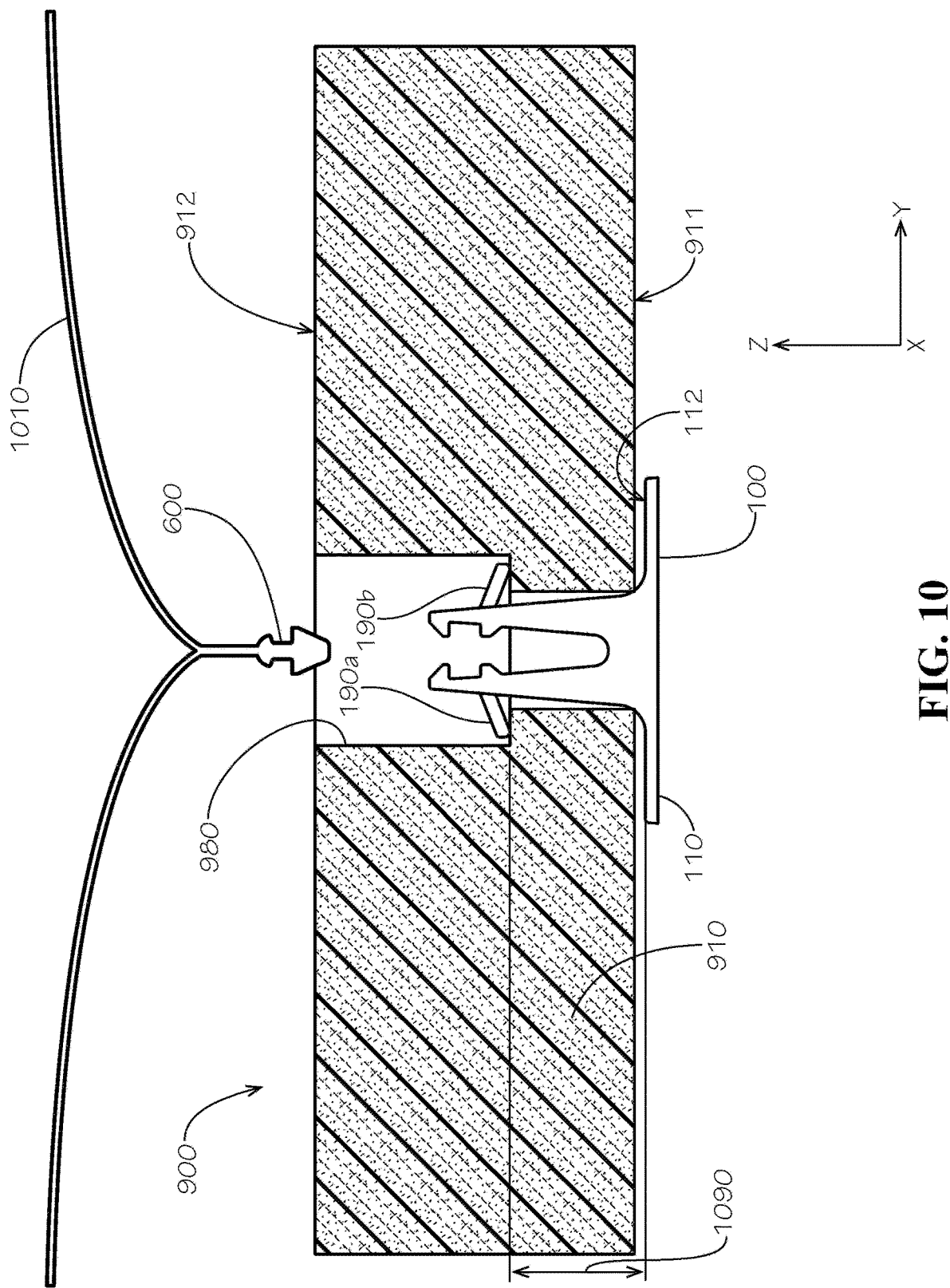
FIG. 10 is a partial sectional end view of the clip and the base of FIG. 9 after installation of the clip into the base but before installation of the suspender into the clip.

FIG. 10 is a partial sectional end view of the clip 100 and the base 900 after installation of the clip 100 into the base 900 but before installation or insertion of the suspender 600 into the clip 100. As shown, the upper surface 112 of the base 110 can sit flush against or proximate to the lower surface 911 of the body 910, the presence of the base 110 preventing further insertion of the clip 100 from the bottom. The fins 190a,b can help lock the clip 100 inside the opening 980, preventing backing out of the clip 100 from the opening 980. As shown in a simplified form, the suspender 600 can be attached or secured to a cover 1010 with, for example and without limitation, one or more sewn joints. The cover 1010, which can be a seat cover, can be formed from or define individual panels and can be used to cover the base 900. As shown, a vertical material clearance distance 1090 measured from the upper surface 112 of the base to a closest portion of a one of the fins 190a,b can define a maximum clearance for receiving and locking in place with respect to the clip 100 a portion of the base 900 therebetween.

As shown, the base 110 of the clip 100 can engage, face, contact, or be positioned against a surface of the base 900 of the assembly 1000 facing in a direction opposite from an upper surface 912, which can be the lower surface 911 or a surface offset from the lower surface 911. The fins 190a,b of the respective first wall 150a and the second wall 150b can engage, face, contact, or be positioned against a surface of the base 900 of the assembly 1000 facing in the same direction as the upper surface 912, which can be the shoulder surface 986.

Figure 11:
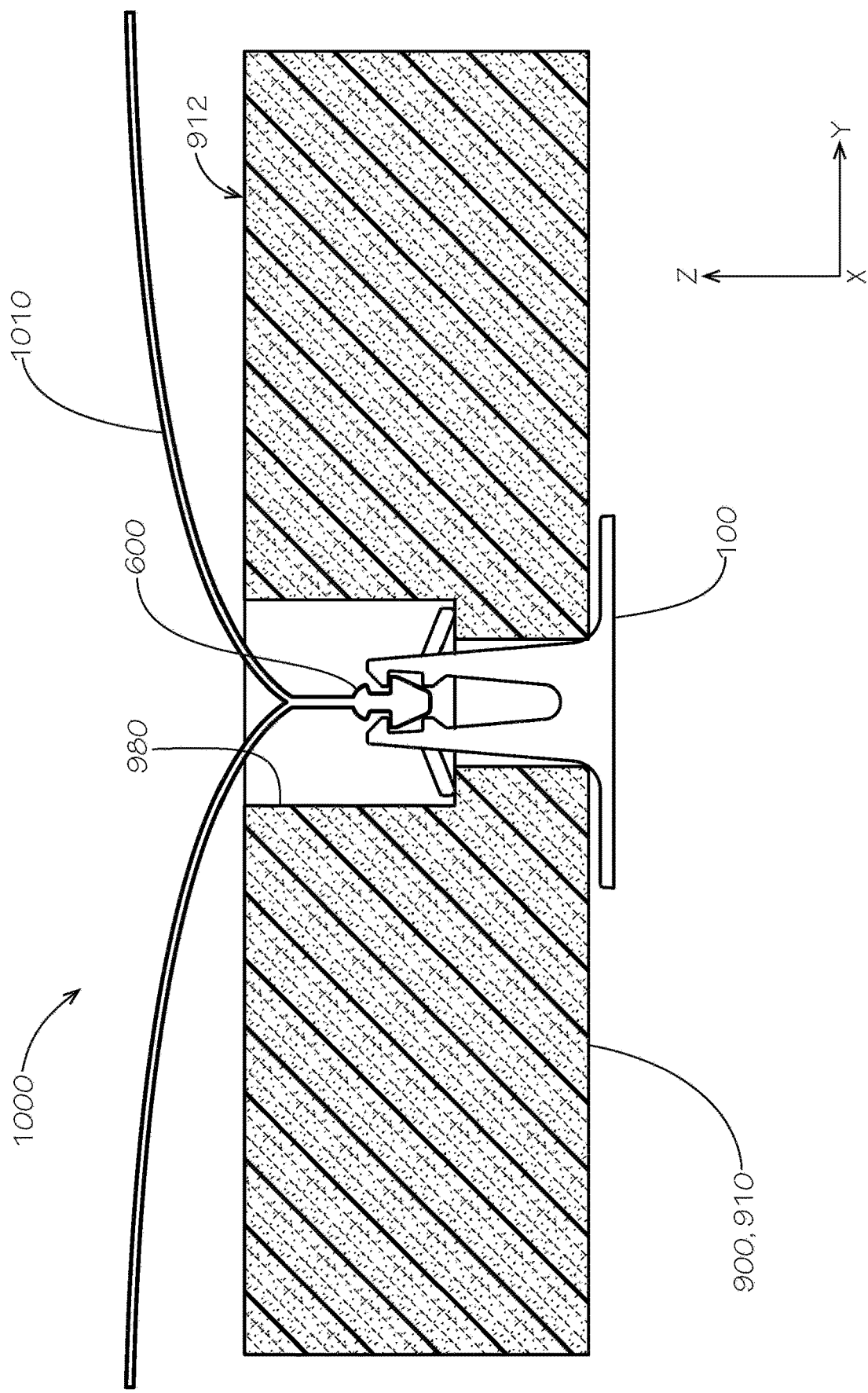
FIG. 11 is a partial sectional end view of the clip of FIG. 1 and the base after installation of the clip into the base and after installation of the suspender into the clip.

FIG. 11 is a partial sectional end view of the clip 100 and the base 900 after installation of the clip 100 into the base 900 and after captive installation of the suspender 600 into the clip 100, thereby forming an assembly 1000. The cover 1010 is shown loose above the base 900 but upon fastening of the cover 1010 through assembly of the suspender 600 with other instances of the clip 100, the cover 1010 can be as taut or as tight as desired against the upper surface 912 and any other surface of the base 900. The assembly 1000 can thereby comprise the base 900 positioned between the cover 1010 and the base 110 of the clip 100 and can comprise each of the cover 1010 and the one or more clips 100.

More specifically, a method of assembling the assembly 1000 can comprise inserting the clip 100 through one of the plurality of openings 980 and inserting the suspender 600 into the gap 168 (shown in FIG. 1) of the clip 100 defined by the first latch nail 160a (shown in FIG. 1) and the second latch nail 160b (shown in FIG. 1). Inserting the clip 100 through one of the plurality of openings 980 can result in a sound such as, for example and without limitation, an audible "pop" that can indicate full engagement of the clip 100 with the respective opening 980 of the base 900.

Figure 12:
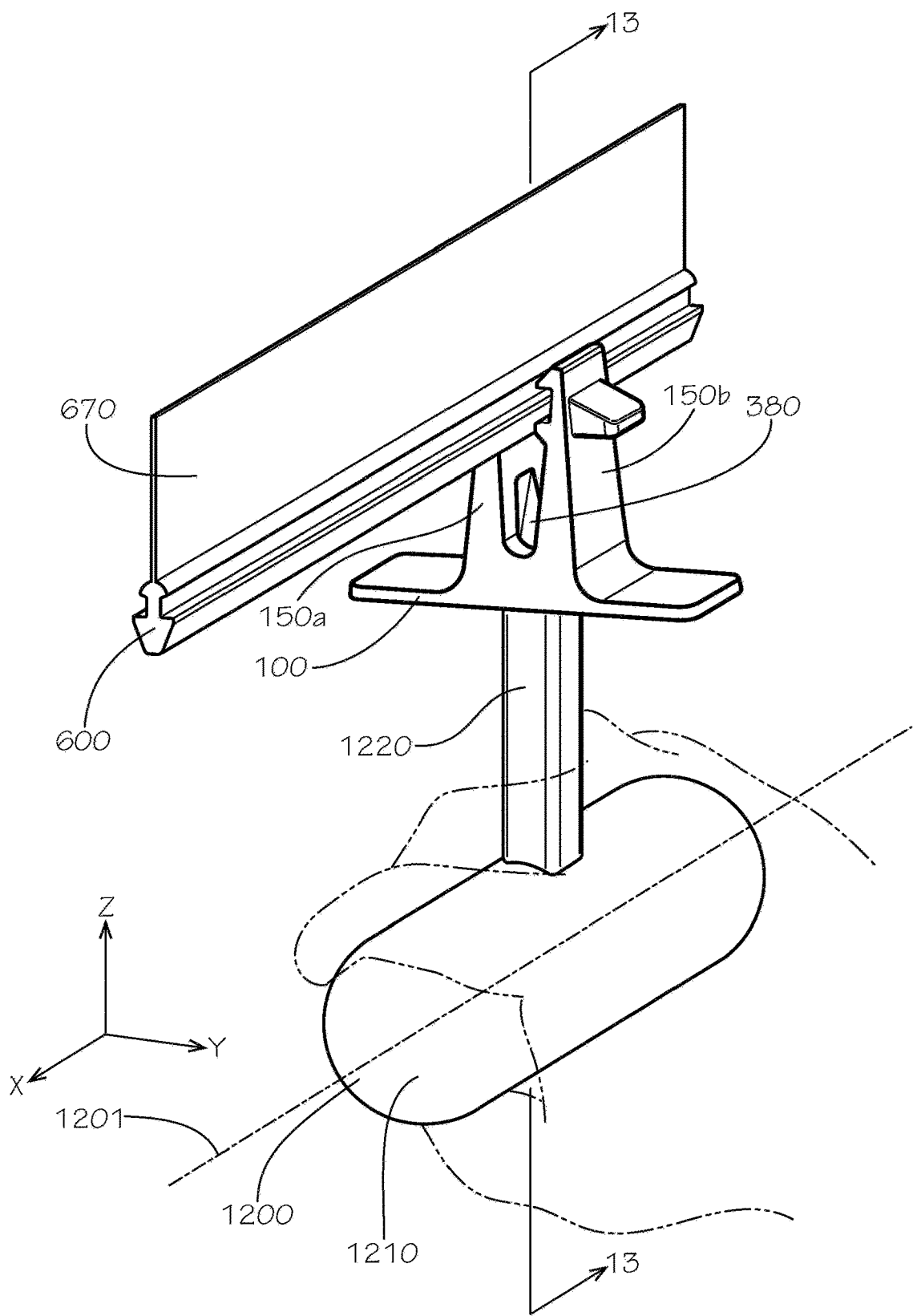
FIG. 12 is a top perspective view of the clip and suspender assembly of FIG. 6 with a removal tool inserted into the clip from the bottom.

FIG. 12 is a top perspective view of an assembly of the clip 100 and the suspender 600 with the removal tool 1200 inserted into the clip 100 from the bottom through the cutout 380. As shown, the removal tool 1200 can comprise a handle 1210 and a shaft 1220 extending from the handle 1210. The handle 1210 can be made circular in cross-section or otherwise made comfortable to grip with a hand of a user (which can be an assembly operator), and the shaft 1220 can be made sufficiently strong to not break under use but otherwise be non-obtrusive to the user. As shown, the handle can have a capsule shape defining a central axis 1201.

It can become desirable to remove the suspender 600 from the clip 100 in any one of a number of scenarios such as, for example and without limitation, after incorrect assembly of the two components during manufacturing, after the discovery of a defect in one or more components after assembly, and during maintenance or repair services for accessories hidden behind the cover 1010 (e.g., seat heater wires). An ability to remove the suspender 600 and thereby disassemble the components could be beneficial due to the cost of the cover 1010, which can be made from expensive materials and require significant labor to fabricate. The assembly 1000 (shown in FIG. 11) can itself become even more expensive as not only the cover 1010 but also other optional accessories such as heaters, control wires, air bag components can be assembled as part of the seat. Even if the suspender 600 and any one or more of the clips are misaligned during assembly, the misaligned parts can simply be disassembled using the removal tool 1200 and then the parts can be reassembled.

More specifically, a method of removing the suspender 600 from the clip 100 can comprise inserting the removal tool 1200 in the Z-axis direction into the cutout 380 defined in the base 110 of the clip 100, spreading apart the first wall 150*a* and the second wall 150*b* to increase the size of the gap 168 (shown in FIG. 1) therebetween, and removing the suspender 600 from the clip 100.

FIGS. 13-15 show various exemplary shapes of the removal tool 1200 given a particular size and shape of the cutout 380, which can itself be adjusted as desired and can be tapered as shown. A design of the clip 100 and the removal tool 1200 and the relationship between the two components can reflect any combination of the exemplary shapes shown in FIGS. 13-15. FIG. 13 is a partial sectional view of the clip 100, the suspender 600, and the removal tool 1200. As shown, a tip 1310 of the removal tool 1200 can be narrower than the width W of the cutout 380 in the Y-axis direction at the lower surface 111 of the base 110 but wider than a width of the cutout 380 at a position distal from the lower surface 111. The resulting interference between the tip 1310 and the tapered cutout side walls 510*a,b* can cause the walls 150*a,b* of the clip 100 to separate or move away from each other and thereby open up the gap 168 between the latch nails 160*a,b* sufficiently to allow removal of the suspender 600 in at least the Z-axis direction and, depending on the degree of insertion of the removal tool 1200 and on whether other clips are still assembled, also removal of the suspender 600 in the X-axis direction. As shown, a body 1305 of the removal tool 1200 and, more specifically, the tip 1310 can touch the clip but not necessarily the suspender 600 itself during the removal operation.

FIG. 14 shows the removal tool 1200 in combination with the same clip 100 in accordance with another aspect of the current disclosure. As shown, a narrow portion 1420 of the tip 1310 of the removal tool 1200 can extend upward from a wide portion 1410 (such as the shape previously shown in FIG. 13) and reach the suspender 600 such that as the wide portion 1410 of the removal tool 1200 spreads apart the walls 150*a,b* the narrow portion 1420 contacts and then pushes the suspender 600 from the suspender retention cavity 280.

FIG. 15 shows the removal tool 1200 in accordance with yet another aspect of the current disclosure. As shown, a portion 1430 and more specifically the tip 1310 of the removal tool 1200 can reach through the cutout 380 defined in the clip 100 and contact the suspender 600 such that as the tip 1310 of the removal tool 1200 centers between and spreads apart the walls 150*a,b* by pushing outward against and thereby spreading the guide rails 170*a,b* sufficiently to remove the suspender 600. Such spreading of the walls 150*a,b* at the guide rails 170*a,b* can be facilitated by the definition of sloped or tapered lower side surfaces of the guide rails 170*a,b* as shown.

Figure 16B:
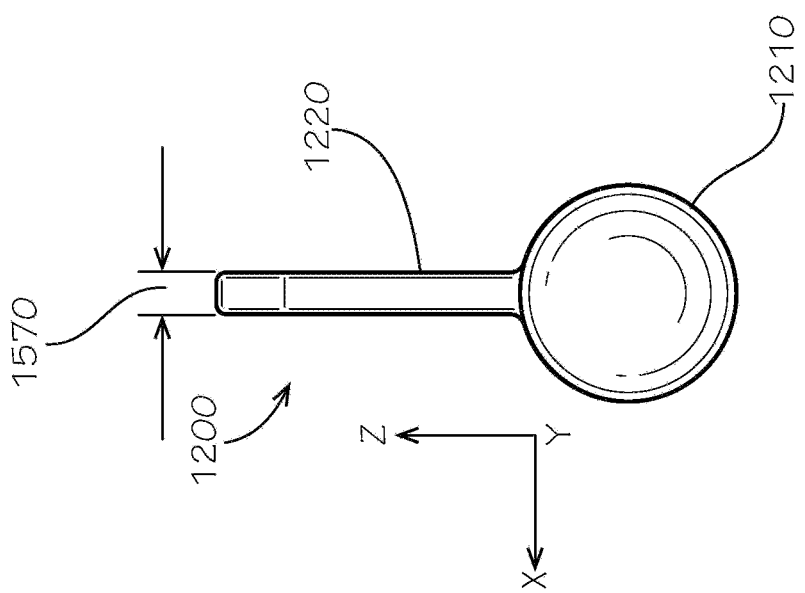
FIG. 16B is an end view of the removal tool of FIG. 16A.
Figure 16A:
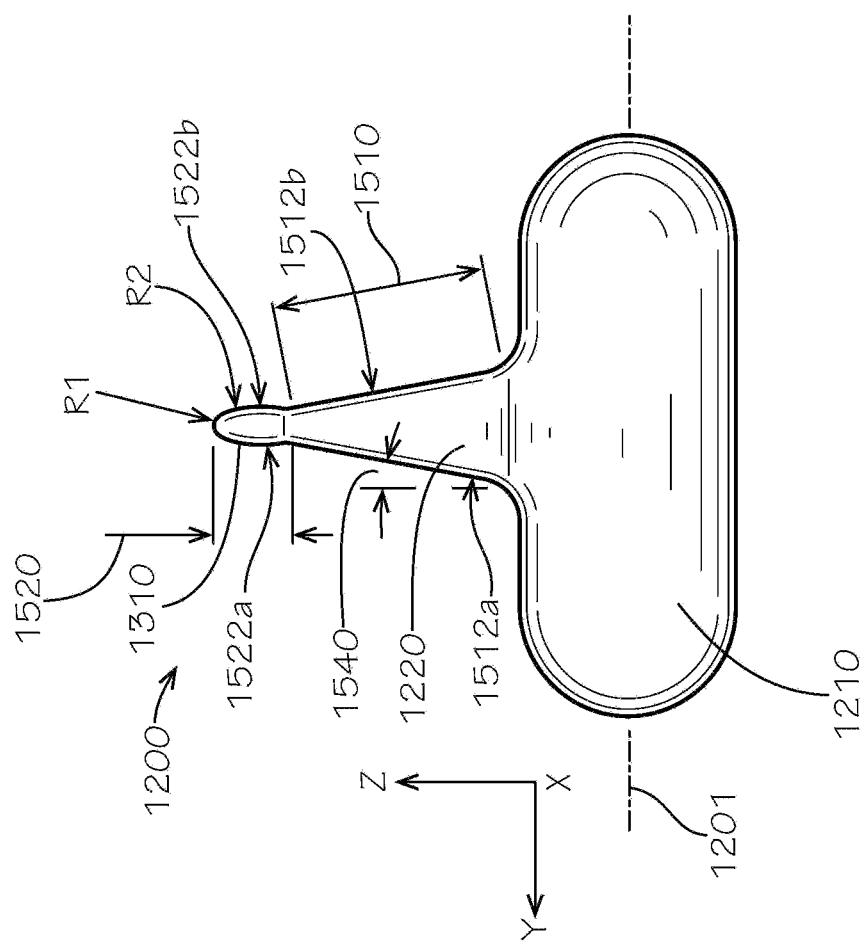
FIG. 16A is a side view of the removal tool of FIG. 12 in accordance with another aspect of the current disclosure.

FIGS. 16A and 16B shows the removal tool 1200 in accordance with yet another aspect of the current disclosure. As shown in FIG. 16A, the shaft 1220 can comprise a first portion 1510 defining side surfaces 1512*a,b* and a second portion 1520 defining side surfaces 1522*a,b* of the tip 1310. Each of the side surfaces 1522*a,b* or a portion thereof can be angled with respect to a centerline axis of the shaft 1220 by an angle 1540. The side surfaces 1522*a,b* of the second portion 1520 can be radiused as shown with radii R1 and R2. As shown in FIG. 16B, the shaft 1220 of the removal tool 1200 can define a shaft thickness 1570 in the X-axis direction, which can be constant up and down the shaft 1220.

In some aspects, as shown in FIG. 12, the central axis 1201 of the handle 1210 can be aligned with the X-axis direction of the clip 100 when inserting the removal tool 1200 to remove the suspender 600. In other aspects, as with the handle 1210 shown in FIGS. 16A and 16B, the central axis 1201 of the handle 1210 can be aligned with the Y-axis direction of the clip 100 when inserting the removal tool 1200 to remove the suspender 600. In the latter case, the tapered shaft 1220 of the removal tool 1200 can approximately match and yet not necessarily interfere with the cutout side walls 510*a,b* of the cutout 380. Instead, the bulbous second portion 1520 of the shaft 1220 can be allowed to reach towards the suspender 600 and push the guide rails 170*a,b* apart to open the gap 168 (shown in FIG. 1). Furthermore, a neck defined by an intersection of the first portion 1510 and the second portion 1520 can catch on the guide rails 170*a,b* to help prevent further movement of the shaft 1220 into the clip 100 and thereby help prevent potential jamming. In various aspects, including with the removal tool 1200 shown in FIGS. 16A and 16B, engagement of the removal tool 1200 with the clip 100 sufficient to remove the suspender 600 can be accompanied by a click or snap sound to indicate proper engagement of the removal tool 1200 and removal of the clip 100.

Figure 17A:
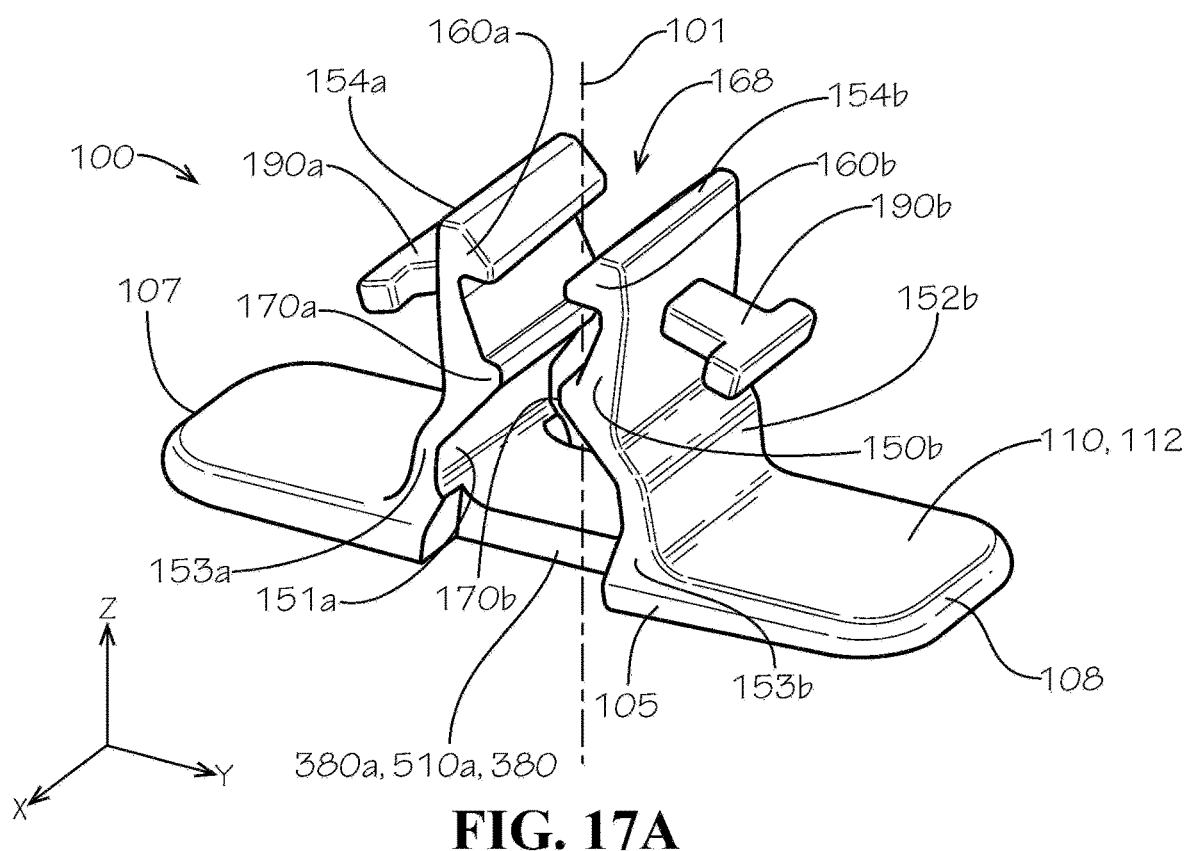
FIG. 17A is a top perspective view of the clip in accordance with another aspect of the current disclosure.

FIGS. 17A-17I show the clip 100 in accordance with another aspect of the current disclosure. FIG. 17A is a top perspective view of the clip 100. As shown, the walls 150*a,b* can extend from the base 110. As also shown, the fins 190*a,b* can extend respectively from the walls 150*a,b*. Cutouts 380*a,b* (380*b* shown in FIG. 17B), which can respectively define the cutout side walls 510*a,b* (510*b* shown in FIG. 17B), can respectively extend from the first end 105 and the second end 106 (shown in FIG. 17B) of the clip 100 by a distance D (shown in FIG. 17B). At least a portion of a surface defined by each of the cutout side walls 510*a,b* can face or be aligned with any of the X, Y, or Z directions. A portion of the base 110 extending between the walls 150*a,b* can at least in part define the cutouts 380*a,b* or the cutout 380, which can be itself comprise the cutouts 380*a,b*. The same portion of the base 110 can define a cross member 570 (shown in FIG. 17B), which can form a portion of the base 110 and can define a width 577 (shown in FIG. 17E) in the X-axis direction.

Figure 17B:
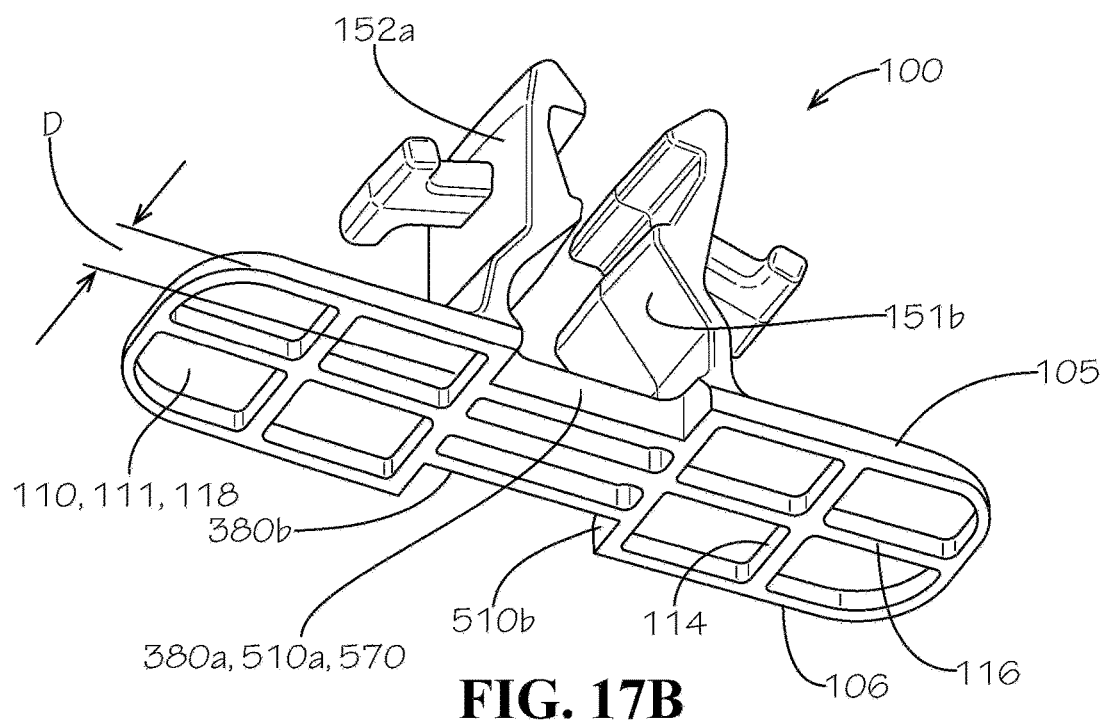
FIG. 17B is a bottom perspective view of the clip of FIG. 17A.

FIG. 17B is a bottom perspective view of the clip 100 of FIG. 17A. In some aspects, the base 110 can define base cavities 118 formed by ribs 114,116 in the lower surface 111. By defining the base cavities 118 in the base 110, strength can be maintained (by the presence of the ribs 114,116, which can intersect at angles) while at the same time minimizing a weight of the base 110 and therefore also an overall weight of the clip 100 (by the removal of material at each of the base cavities 118). In some aspects, the base cavities 118 can be pockets that do not extend completely through the base 110. In other aspects, the base cavities 118 can extend completely through the base 110 from the lower surface 111 to the upper surface 112.

Figure 17C:
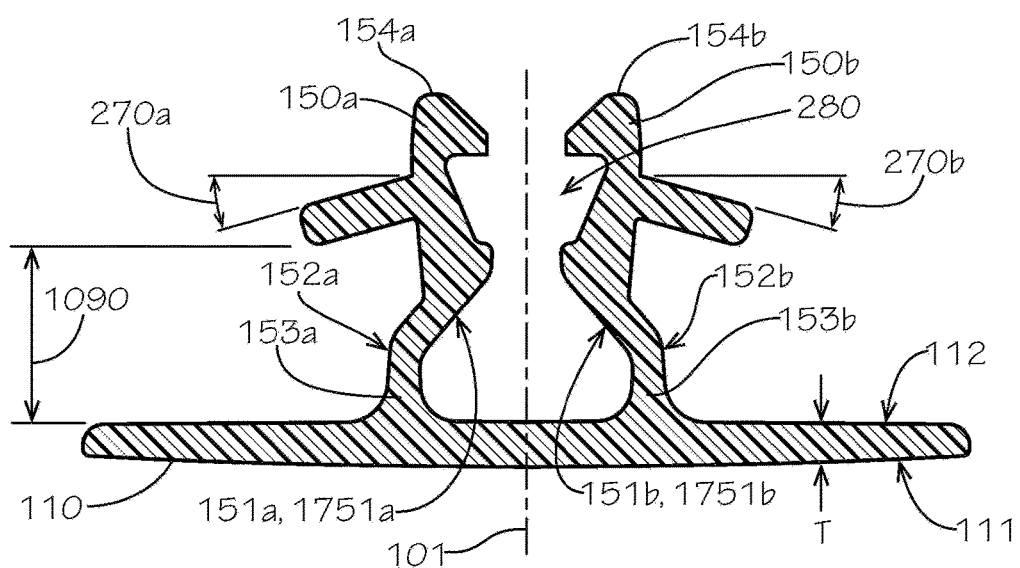
FIG. 17C is a sectional view of the clip of FIG. 17A taken from line 17C-17C of FIG. 17D.
Figure 17D:
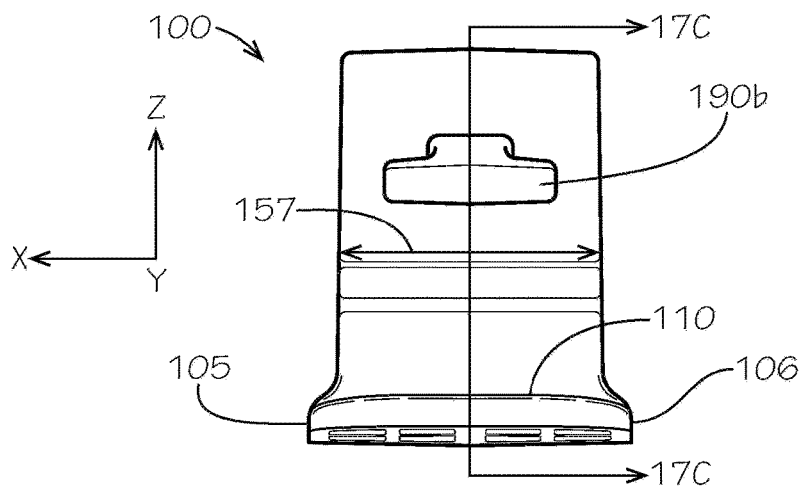
FIG. 17D is a side view of the clip of FIG. 17A.

FIG. 17C is a section view of the clip 100 of FIG. 17A taken from line 17C-17C of FIG. 17D. In some aspects, as shown, a maximum value of the thickness T of the base 110 can taper slightly in thickness in a direction outward and away from the closest wall 150*a,b*. As shown, a portion of the inner surface 151*a,b* or the outer surface 152*a,b* can define an angle with respect to the lower surface 111 or the upper surface 112 of the base 110 that can vary from the proximal end 153*a,b* of each of the walls 150*a,b* to the distal end 154*a,b* of each of the walls 150*a,b*. As shown in FIG. 17B, the walls 150*a,b* can be separated by a distance approximately equal to the width W (shown in FIG. 17E) of the cutouts 380*a,b* (shown in FIGS. 17A and 17B) proximate to the proximal ends 153*a,b*, while the walls 150*a,b* or portions thereof can be closer to each other proximate to the distal ends 154*a,b* and between the distal ends 154*a,b* and the proximal ends 153*a,b*. A wider opening between the walls 150*a,b* proximate to the base 110 can facilitate entrance of the removal tool 1200 (shown in FIG. 17F) and at the same time can increase the surface area of respective angled portions 1751*a,b* of the inner surface 151*a,b* against which the removal tool 1200 can push and by such pushing move the walls 150*a,b* apart to release the suspender 600 (shown in FIG. 6). Such increased surface area can reduce friction and binding between the removal tool 1200 and the clip 100. Also shown, the suspender retention cavity 280 of the clip 100 can be shaped to match a shape of a mating portion of the suspender 600 (shown in FIG. 6), which can further secure the suspender 600 inside the suspender retention cavity 280 and eliminate or reduce the risk of movement and even rattling of the suspender, which can potentially result in noise audible to a user.

FIG. 17D is a side view of the clip 100 of FIG. 17A. As shown, a width 157 of the walls 150*a,b* of the clip 100 can be less than a width of the base 110 in the X-axis direction.

Figure 17E:
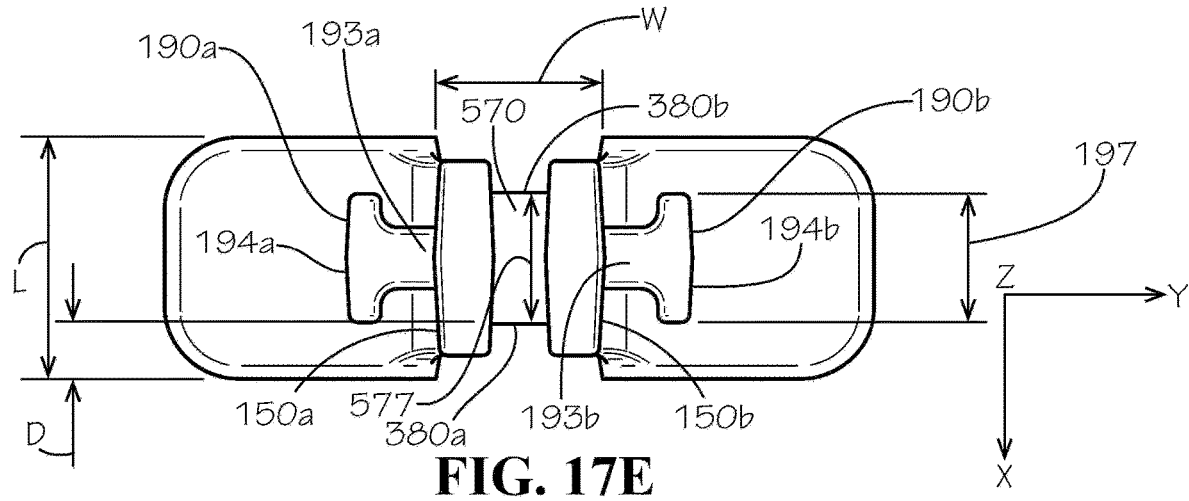
FIG. 17E is a top plan view of the clip of FIG. 17A.

FIG. 17E is a top plan view of the clip 100 of FIG. 17A. The width W and the length L of the cutouts 380*a,b* can be measured as shown, as can the depth D of each cutout 380*a,b*. In some aspects, as shown, the width 197 at least one of the fins 190*a,b* in the X-axis direction can vary over an extended length of the respective fin 190*a,b* from a base portion 193*a,b* of the fin 190*a,b* to a distal portion 194*a,b* of the fin 190*a,b* in the Y-axis direction. For example and without limitation, at least one of the fins 190*a,b* can have a T-shape as shown. Increasing the width 197 at the distal portion 194*a* can minimize rotation of the clip 100 about the Y-axis direction and can minimize the weight of the fins 190*a,b* and therefore also the overall weight of the clip 100. The walls 150*a,b* can be visible beyond and above the respective cutouts 380*a,b* such that they can be engaged by the removal tool 1200 (shown in FIG. 17F).

Figure 17F:
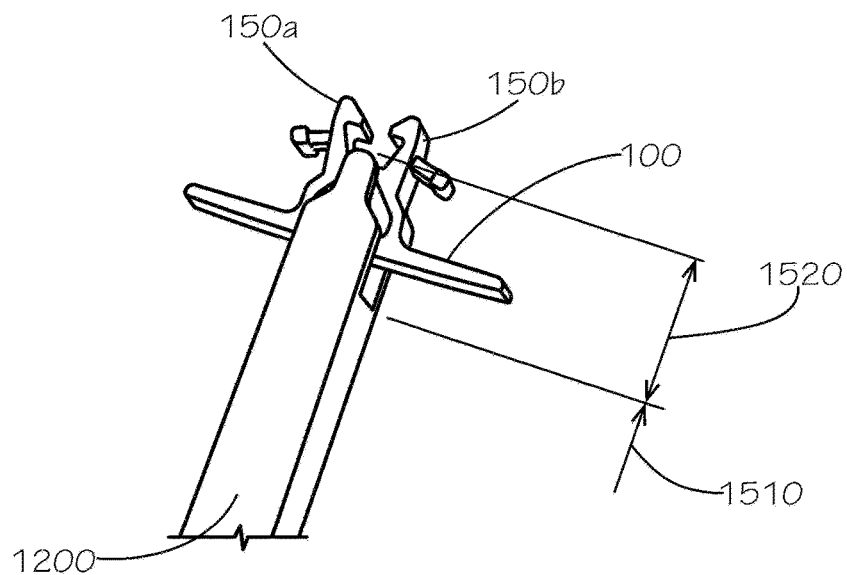
FIG. 17F is a bottom perspective view of the clip of FIG. 17A with a removal tool inserted into the clip from the bottom.

FIG. 17F is a bottom perspective view of the clip 100 of FIG. 17A with the removal tool 1200 inserted into the clip 100 from the bottom.

Figure 17G:
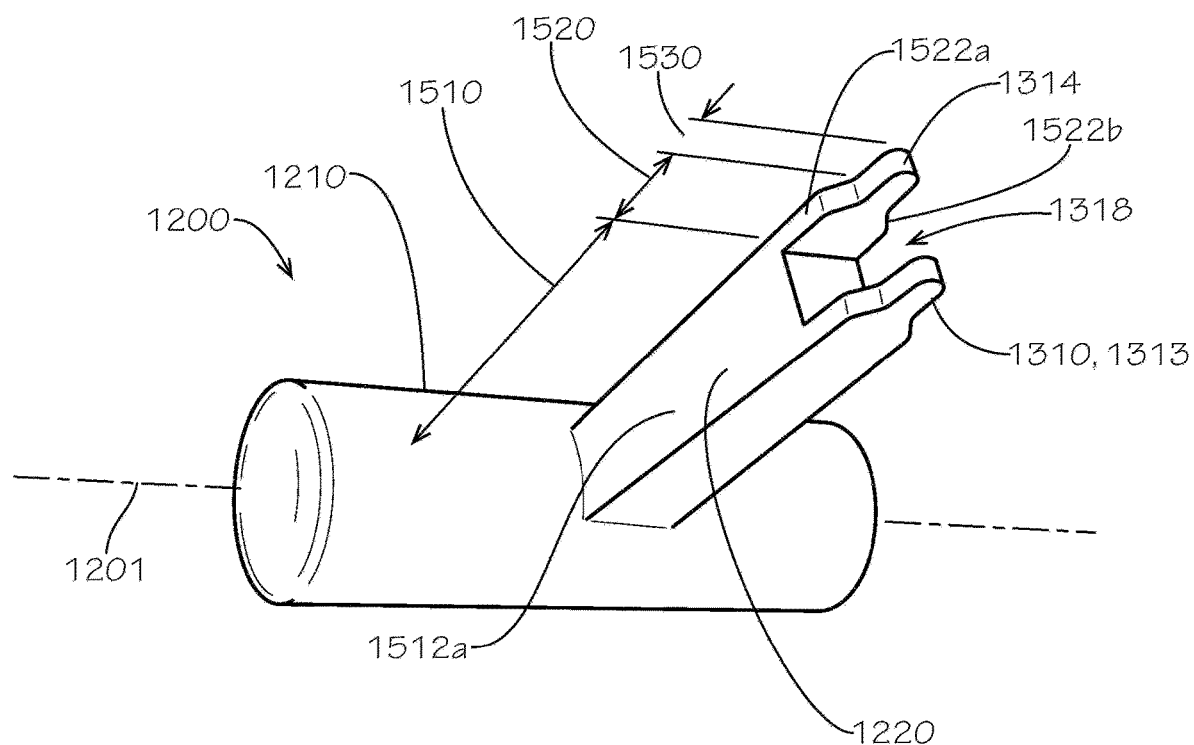
FIG. 17G is a top perspective view of the tool of FIG. 17F.
Figure 17I:
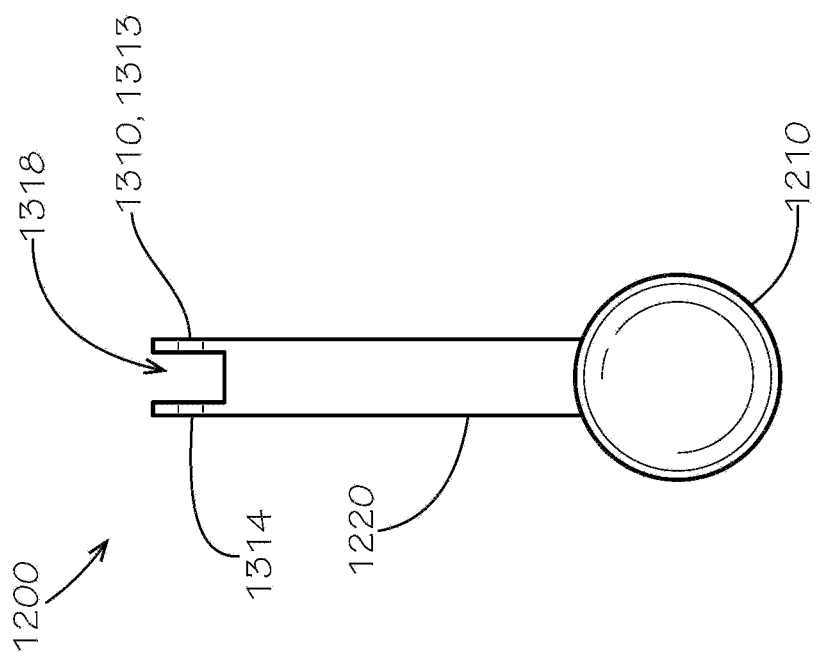
FIG. 17I is an end view of the tool of FIG. 17F.
Figure 17H:
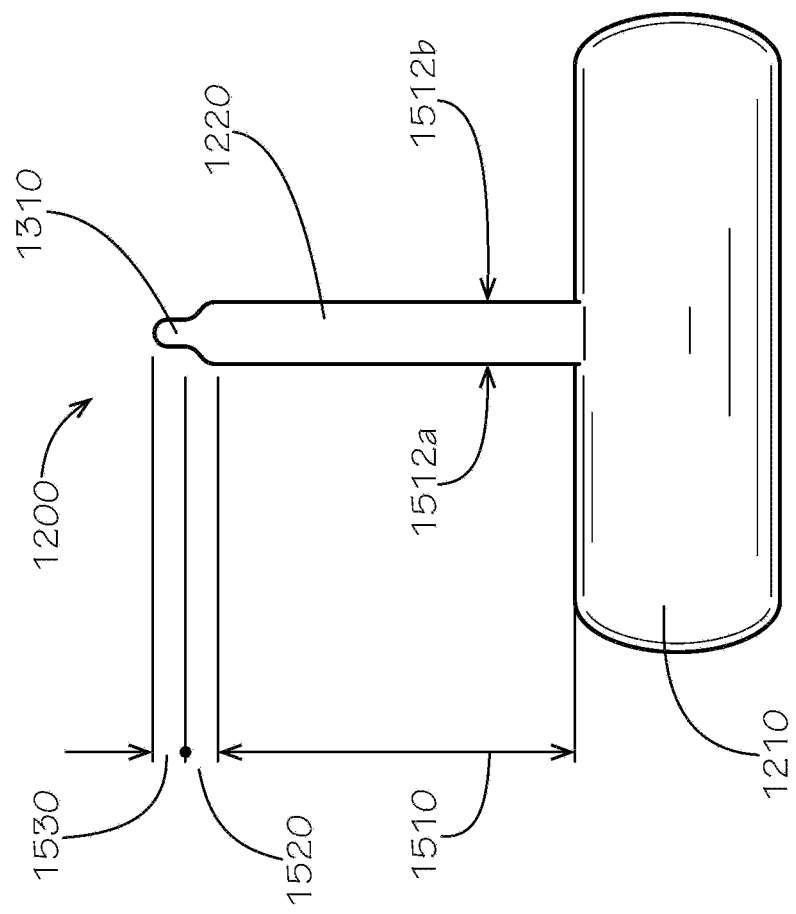
FIG. 17H is a side view of the tool of FIG. 17F.

FIG. 17G is a top perspective view, FIG. 17H is a side view, and FIG. 17I is an end view of the removal tool 1200. Again, the removal tool 1200 can comprise the handle 1210 and the shaft 1220. The first portion 1510 can define the side surfaces 1512*a,b* (1512*b* shown in FIG. 17H) and the second portion 1520 can define the side surfaces 1522*a,b* of the tip 1310. The shaft 1220 can further define a third portion 1530. The tip 1310 of the shaft 1220 can comprise a first side portion 1313 and a second side portion 1314, which can define a forked tip 1310 defining a tool cavity 1318 therebetween. The tool cavity 1318 can be sized to receive the cross member 570 (shown in FIG. 17B) of the clip 100 and can be made deep enough for the tip 1310 of the removal tool 1200 to spread apart the walls 150*a,b* (shown in FIG. 17F) and push the suspender 600 (shown in FIG. 6) from the clip 100. More specifically, the second portion 1520 of the shaft 1220 can push against and spread apart the wall 150*a,b*, and the third portion 1530 can push the suspender 600.

Figure 18A:
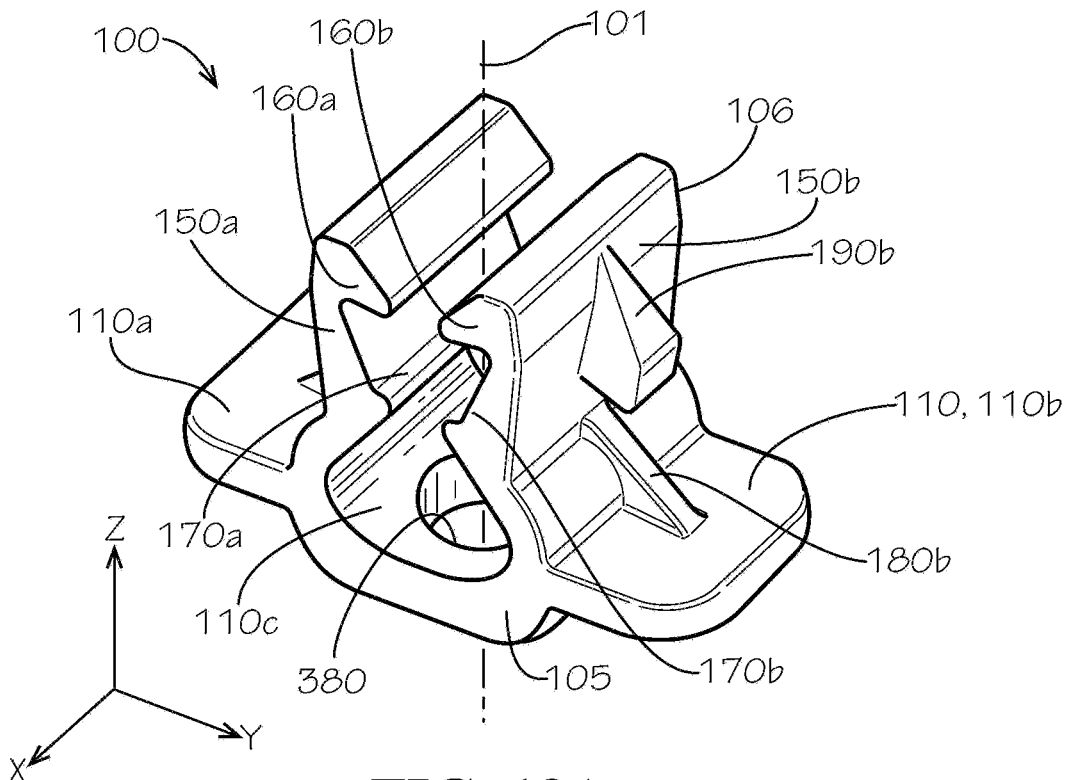
FIG. 18A is a top perspective view of the clip in accordance with another aspect of the current disclosure.

FIGS. 18A-18I show the clip 100 in accordance with yet another aspect of the current disclosure. FIG. 18A is a top perspective view of the clip in accordance with another aspect of the current disclosure. As shown, the base 110 can comprise a base member 110*a* and a base member 110*b*, which can be joined by a base member 110*c*. In some aspects, as previously described, the base members 110*a,b,c* of the base 110 can be oriented in a single plane. In other aspects, as shown, at least one of the base members 110*a,b,c* of the base 110 can be disposed in a different plane than the other base members 110*a,b,c*. The clip 100 can comprise a gusset 180*a,b* (180*a* shown in FIG. 18B) extending and reinforcing between the base members 110*a,b* and the respective walls 150*a,b*. The clip 100 can comprise a gusset 180*c* (shown in FIG. 18C) extending and reinforcing between the respective base member 110*a* and the base member 110*c* and a gusset 180*d* (shown in FIG. 18B) extending and reinforcing between the respective base member 110*b* and the base member 110*c*. As shown, the cutout 380, which is shown as a through-hole, can be circular and can be aligned with the axis 101.

Figure 18B:
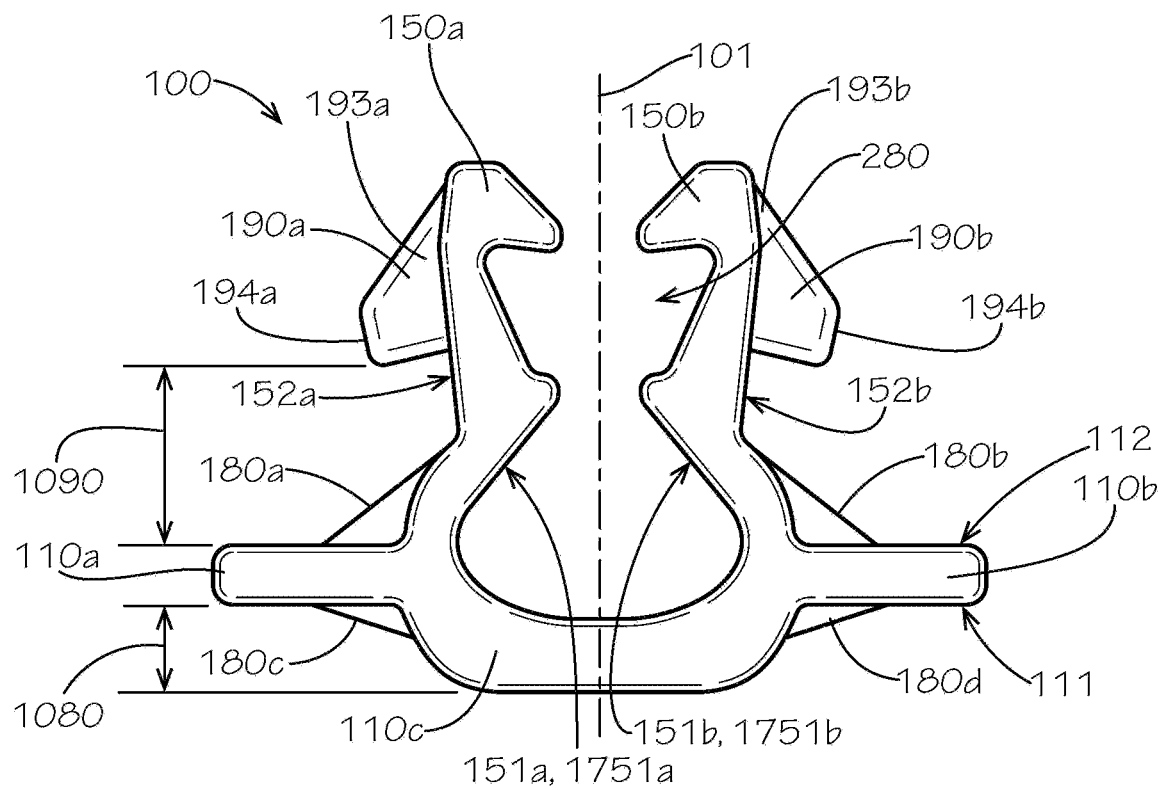
FIG. 18B is an end view of the clip of FIG. 18A.

FIG. 18B is an end view of the clip 100 of FIG. 18A. Each of the fins 190*a,b* can be tapered from the base portion 193*a,b* to the respective distal portion 194*a,b*. By raising the base members 110*a,b* towards the respective fins 190*a,b*, the vertical material clearance distance 1090 can be further reduced.

FIGS. 18C and 18D are a first side view and a second side view, respectively, of the clip 100. As shown, the fins 190*a,b* can be tapered from a bottom end to a top end of the respective fins 190*a,b*, with the bottom end of the fins 190*a,b* proximate to the base 110 and the top end of the fins 190*a,b* distal from the base 110.

FIGS. 18E and 18F are a top plan view and a bottom plan view of the clip 100. As shown, a center of each of the fins 190*a,b* and the gussets 180*a,b,c,d* can be aligned with each other, with a center of the cutout 380, and with a transverse axis or centerline 102.

FIG. 18G shows the base member 110*c* of the clip 100 in accordance with yet another aspect of the current disclosure. The cutouts 380*a,b* can be separated by the cross member 570 and can be bounded or closed on an outer edge by another portion of the base member 110*c*. Without the cross member 570, the cutout 380 can define a rectangular or substantially rectangular shape.

Figure 18H:
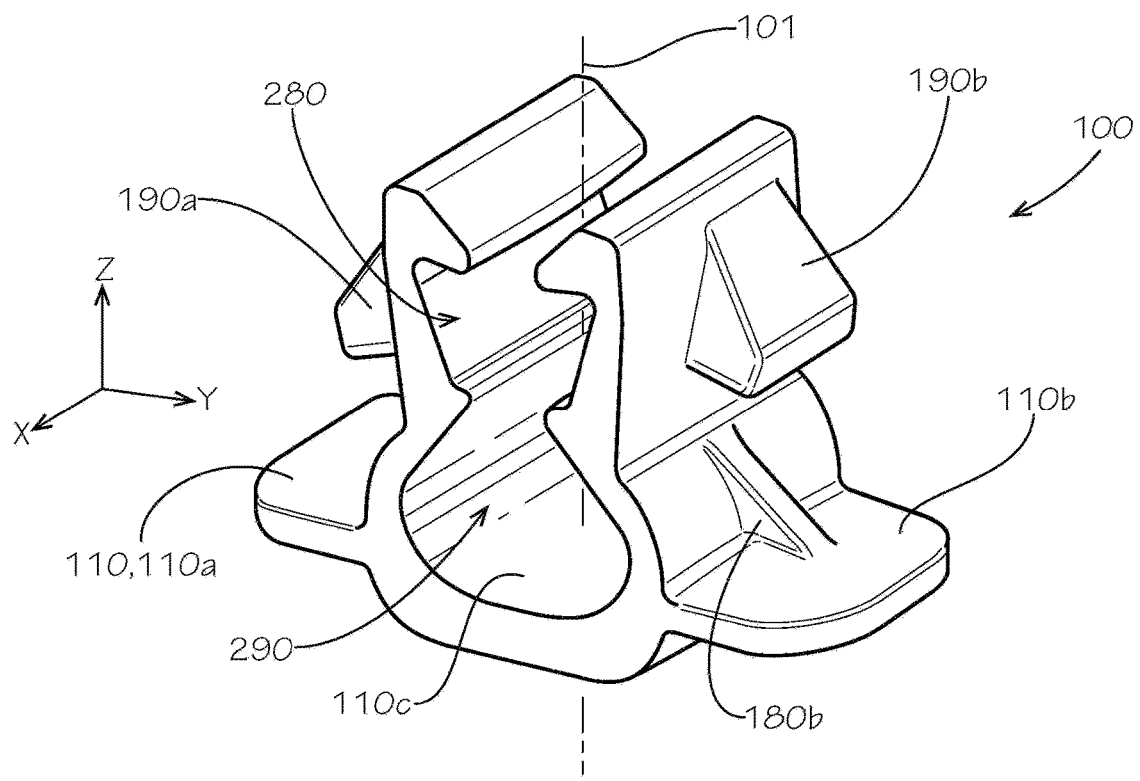
FIG. 18H is a top perspective view of the clip of FIG. 18A in accordance with another aspect of the current disclosure.
Figure 18I:
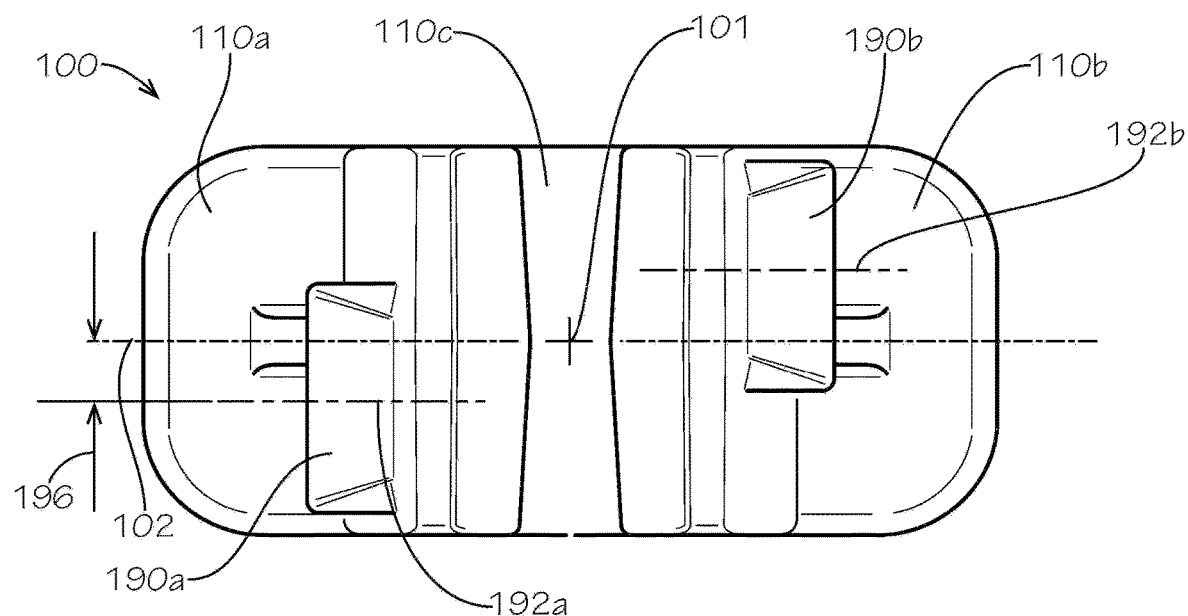
FIG. 18I is a top plan view of the clip of FIG. 18H.

FIGS. 18H and 18I show the clip 100 in accordance with yet another aspect of the current disclosure in which the fins 190*a,b* are offset from each other in the X-axis direction. FIG. 18H is a top perspective view of the clip 100 without the cutout 380 in the base member 110*c*. To remove the suspender 600 (shown in FIG. 6) from the clip 100 shown in FIG. 18H, the removal tool 1200 (shown in FIG. 19A) can be inserted into the expansion cavity 290, which can be defined between the base 110 of the clip 100 and the suspender retention cavity 280 configured to receive the suspender 600 (or otherwise between the base 110 of the clip 100 and the suspender 600, either from above or from below the base 110 of the clip 100). FIG. 18I is a top plan view of the clip of FIG. 18H showing a respective center 192*a,b* of each of the fins 190*a,b* offset from the transverse centerline 102 by an offset distance 196, which can help the clip 100 to better secure inside the base 900 without pulling out through the opening 980, including when a portion of the opening 980 that is distal from the axis 101 or the transverse centerline 102 can better secure or hold the respective fin 190*a,b* than a portion of the opening 980 that is proximate to the axis 101 or the transverse centerline 102.

Figure 19A:
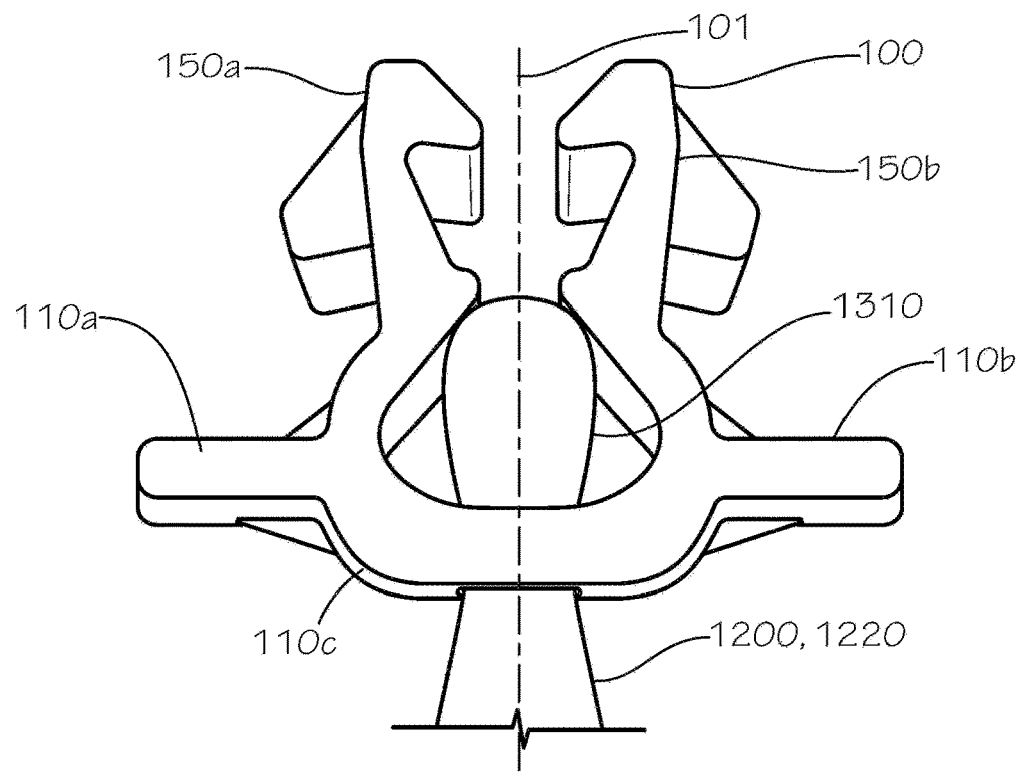
FIG. 19A is a side perspective view of the clip of FIG. 18H with a removal tool inserted into the clip from the bottom.
Figure 19B:
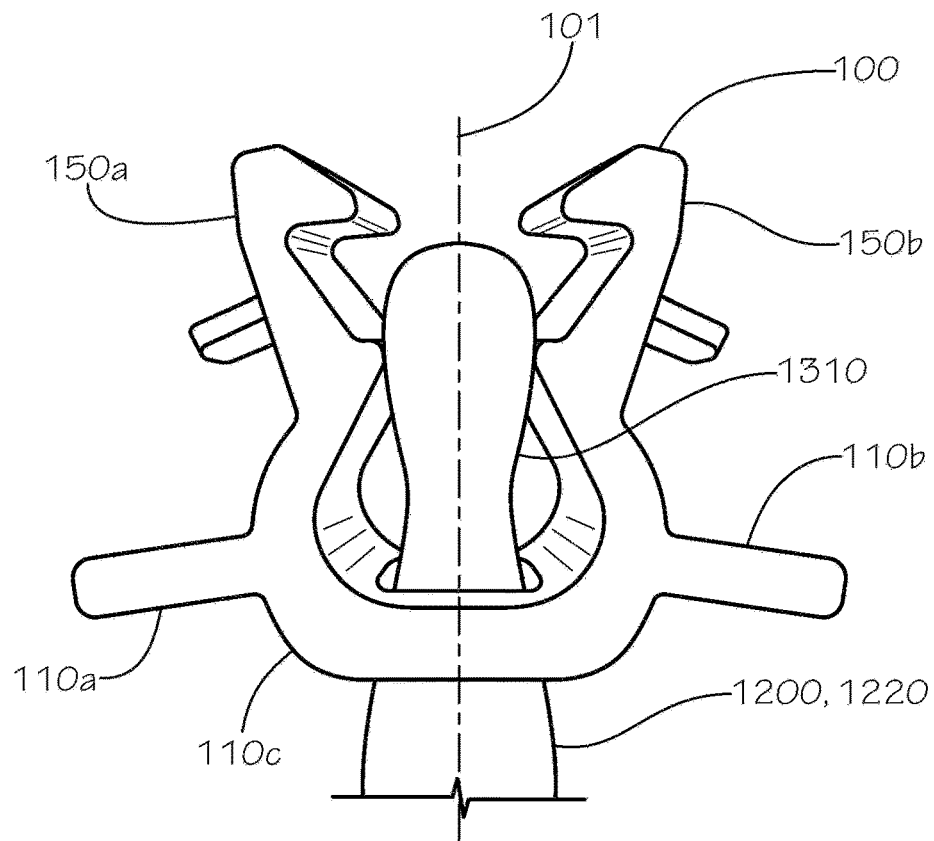
FIG. 19B is a side perspective view of the clip of FIG. 19A with a removal tool inserted further into the clip.

The vertical material clearance distance 1090 can be further reduced, as shown in FIGS. 19A and 19B, by increasing an offset distance 1080 (shown in FIG. 18B) that the base member 110*c* is offset from the base members 110*a,b* of the base 110 relative to the upper surface 112. For example and without limitation, the vertical material clearance distance 1090 can be as little as 2 millimeters or less, and an overall height of the clip 100 can be as little as 12 to 14 millimeters. More specifically, the vertical material clearance distance 1090 can in some aspects be 20 millimeters or less; the vertical material clearance distance 1090 can in some aspects be 15 millimeters or less; the vertical material clearance distance 1090 can in some aspects be 10 millimeters or less; the vertical material clearance distance 1090 can in some aspects be 7.5 millimeters or less; the vertical material clearance distance 1090 can in some aspects be 5 millimeters or less; the vertical material clearance distance 1090 can in some aspects be 4 millimeters or less; and the vertical material clearance distance 1090 can in some aspects be 2.5 millimeters or less. The vertical material clearance distance 1090 can in some aspects be greater than 20 millimeters.

FIG. 19A is a side perspective view of the clip 100 with the removal tool 1200 inserted into the clip 100 along the axis 101 from the bottom. FIG. 19B is a side perspective view of the clip of FIG. 19A without visible gussets and comprising constant-thickness fins in accordance with yet another aspect of the current disclosure with the removal tool 1200 inserted further into the clip 100 along the axis 101 from the bottom.

Figure 20A:
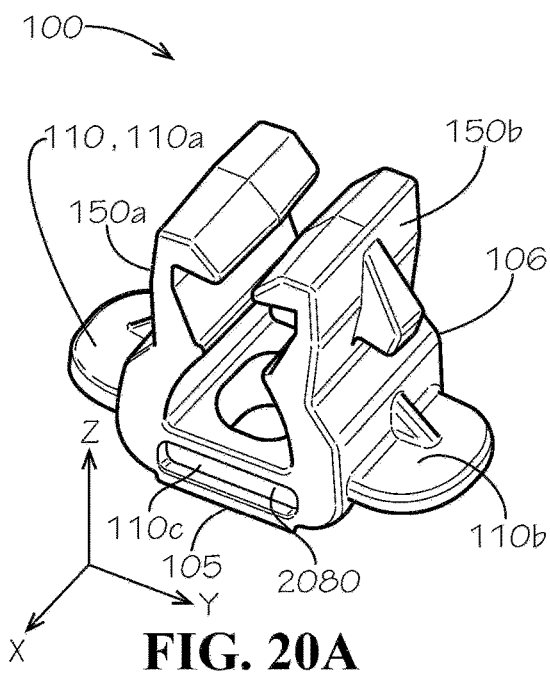
FIG. 20A is a top perspective view of the clip in accordance with another aspect of the current disclosure.

FIGS. 20A-20D show the clip 100 in accordance with yet another aspect of the current disclosure. As shown in FIG. 20A, which is a front perspective view of the clip 100, one or both ends 105,106 of the base 110 and specifically the base member 110c can define a cavity or recess 2080. In some aspects, definition of the recess 2080 in the clip 100 can reduce the material required to form the clip 100 and thereby reduce the weight and cost of the clip 100. In some aspects, the definition of the recess 2080 in the clip 100 can provide a feature that a tool or even automated equipment such as a robot can use to grip, orient, and move the clip 100 during assembly of the clip 100 to the suspender 600 and/or other surrounding structure in an automated assembly process. In some aspects, definition of the recess 2080 in the clip 100 can facilitate manufacture of the clip 100 itself by maintaining an overall dimension of the clip 100 while adjusting a thickness of surrounding portions of the clip 100 as desired.

Figure 20B:
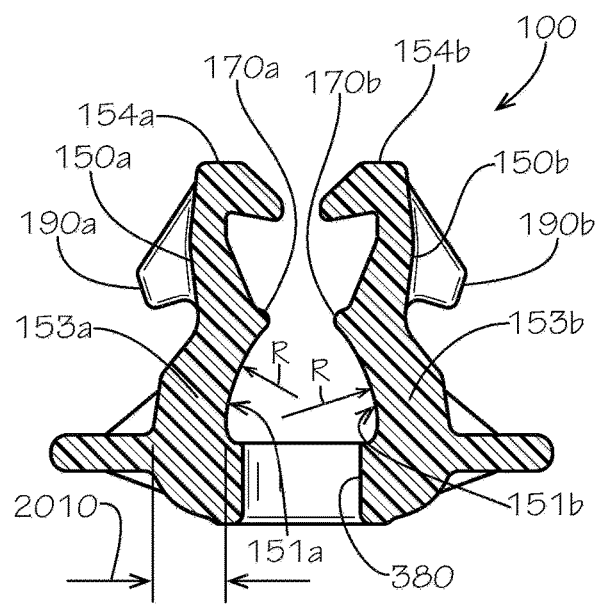
FIG. 20B is a sectional view of the clip of FIG. 20A taken from line 20B-20B of FIG. 20C.

As shown in FIG. 20B, which is a sectional view of the clip 100 taken from line 20B-20B of FIG. 20C, a thickness 2010 of each the walls 150a,b in the Y-axis direction can be greater proximate to or at the respective proximal end 153a,b and below the respective guide rail 170a,b than a thickness of the respective walls 150a,b proximate to or at the respective distal end 154a,b and below the respective guide rail 170a,b. The inside surfaces 151a,b can define radii R. As shown, the fins 190a,b can extend past the respective proximal ends 153a,b of the walls 150a,b in the Y-axis direction or a vertical plane defined by the respective proximal ends 153a,b of the walls 150a,b to facilitate the fins 190a,b engaging the opening 980 defined in the base 900.

Figure 20C:
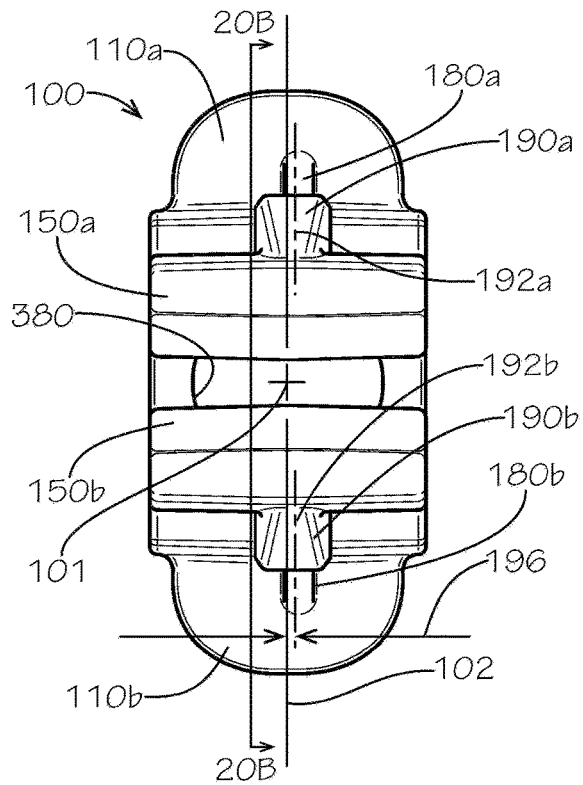
FIG. 20C is a top plan view of the clip of FIG. 20A.

FIG. 20C is a top plan view of the clip 100 of FIG. 20A. As shown, the center 192a,b of each of the respective fins 190a,b and a center of the respective gussets 180a,b can be offset from the transverse centerline 102 by the offset distance 196, which can facilitate fabrication of the clip 100 such as by injection molding.

Figure 20D:
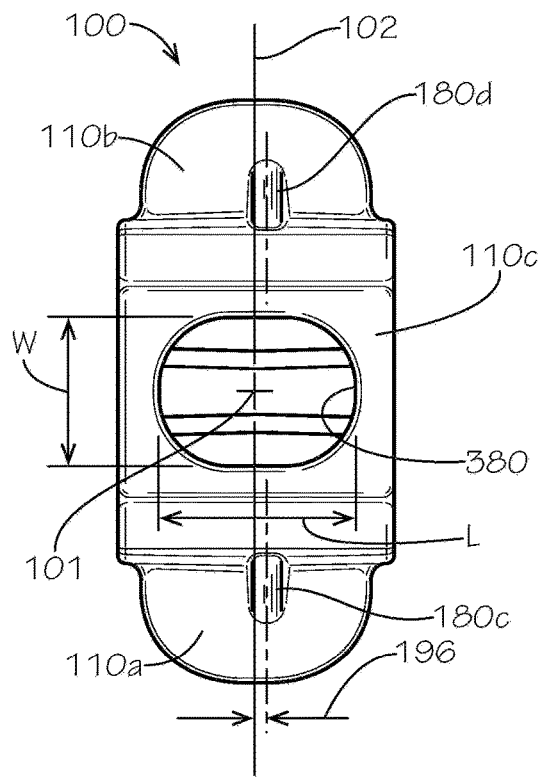
FIG. 20D is a bottom plan view of the clip of FIG. 20A.
Figure 21A:
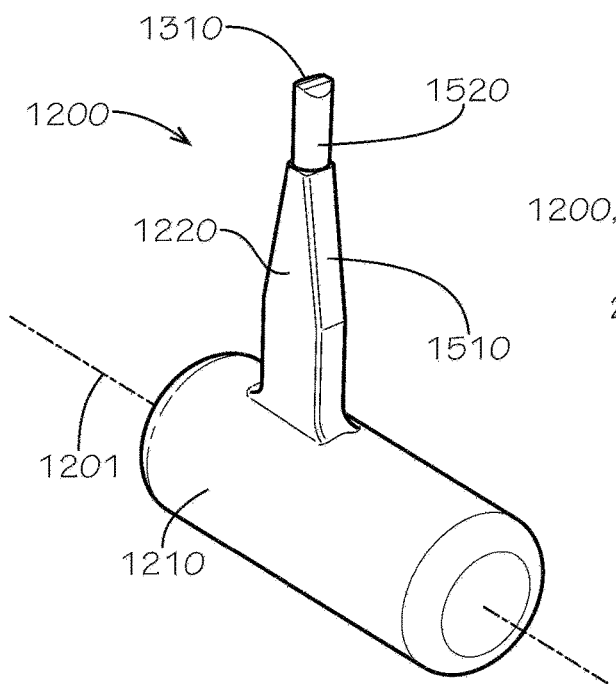
FIG. 21A is a top perspective view of the removal tool of FIG. 12 in accordance with another aspect of the current disclosure.

FIG. 20D is a bottom plan view of the clip 100 of FIG. 20A. As shown, a center of the respective gussets 180c,d can be offset from the transverse centerline 102 by an offset distance such as the aforementioned offset distance 196, which can as noted above facilitate fabrication of the clip 100 such as by injection molding. To facilitate release of the clip 100 from the suspender 600 (shown in FIG. 6) such as with the removal tool 1200 (such as shown in FIG. 21A), the length L of the cutout 380 in the X-axis direction—or in a direction that is parallel to an orientation of the gap 168 defined between the first latch nail 160a and the second latch nail 160b—can be greater than the width W of the cutout 380 in the Y-axis direction—or in in a direction orthogonal to the length L. As shown, the cutout 380 can be a slotted hole and can define an oblong shape.

Figure 21B:
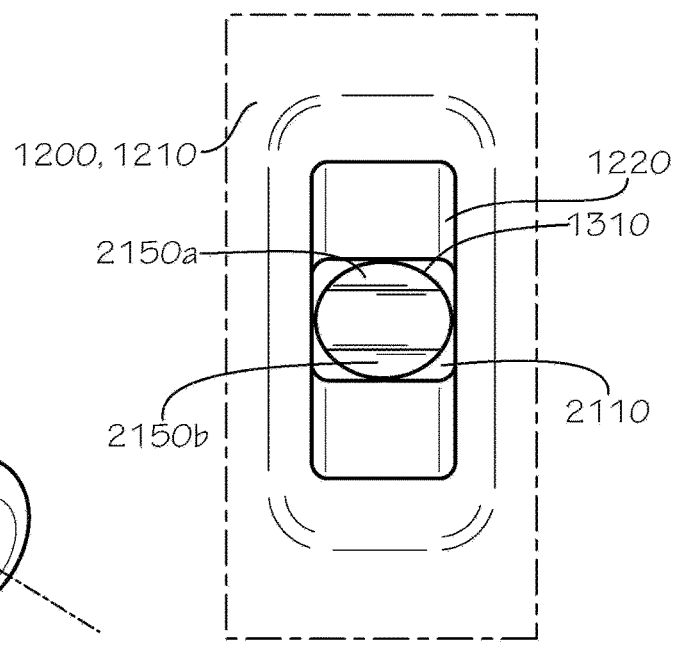
FIG. 21B is a detail top plan view of a shaft of the removal tool of FIG. 21B.
Figure 21C:
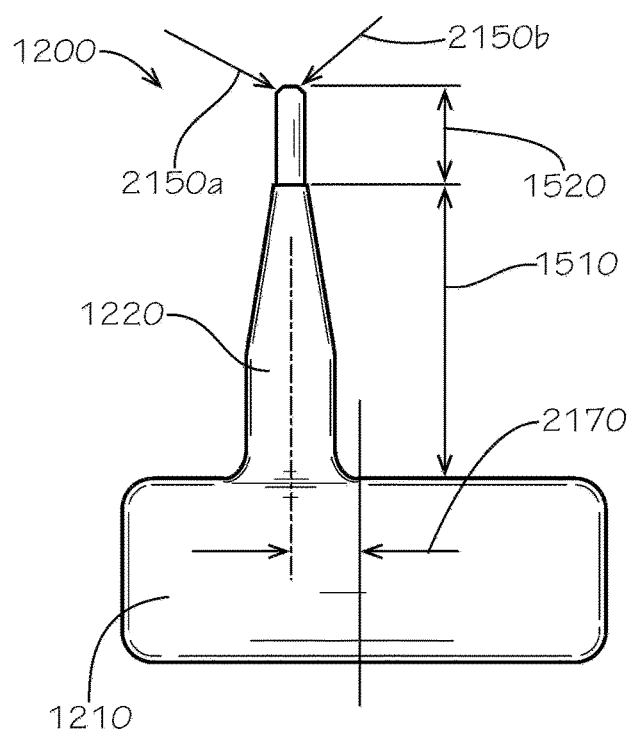
FIG. 21C is a side view of the removal tool of FIG. 21B.
Figure 21D:
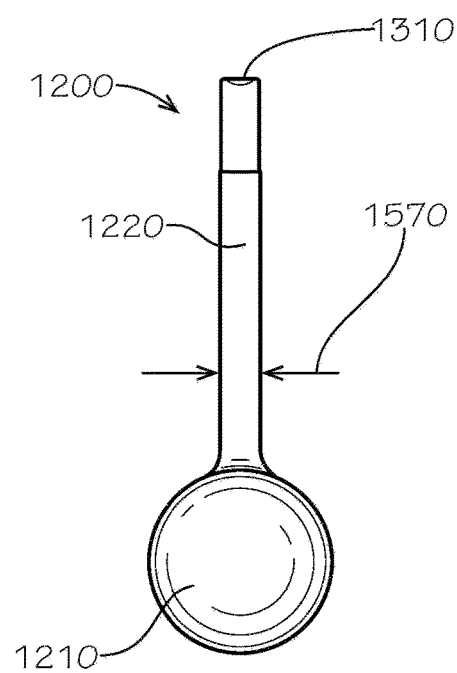
FIG. 21D is an end view of the removal tool of FIG. 21B.

FIGS. 21A-21D show the removal tool 1200 in accordance with another aspect of the current disclosure. As shown in FIG. 21A, which is a top perspective view of the removal tool 1200, the shaft 1220 forming a tapered first portion 1510 can extend from the handle 1210 and the straight second portion 1520 defining the tip 1310 can extend from the first portion 1510. As shown in FIG. 21B, which is a detail top plan view of the shaft 1220 of the removal tool 1200, the shaft 1220 can define a shoulder 2110 such as at an intersection between the first portion 1510 (shown in FIG. 21A) and the second portion 1520 (shown in FIG. 21A). The tip 1310 can define a tapered shape, which can be radiussed or chamfered with edge treatments 2150a, b. FIG. 21C is a side view of the removal tool 1200 of FIG. 21B. As shown, a center of the shaft 1220 of the removal tool 1200 can be offset from a center of the handle 1210 by an offset distance 2170. Such an offset can, for example and without limitation, improve ergonomics for a user of the removal tool 1200. FIG. 21D is an end view of the removal tool 1200 of FIG. 21B.

Figure 22A:
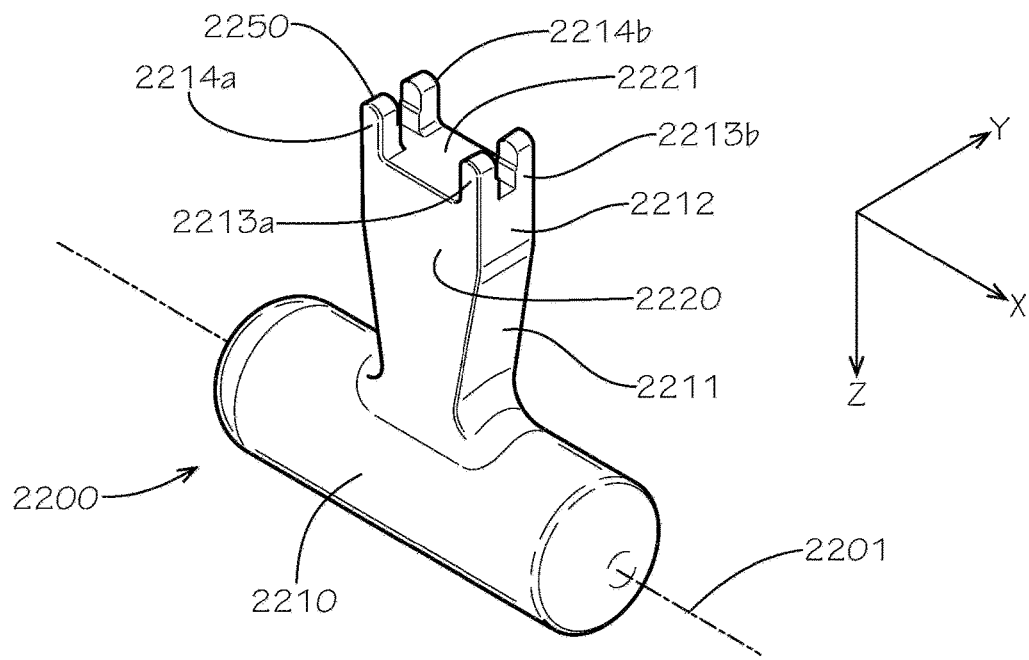
FIG. 22A is a top perspective view of an installation tool for assembling the assembly of FIG. 11.
Figure 22B:
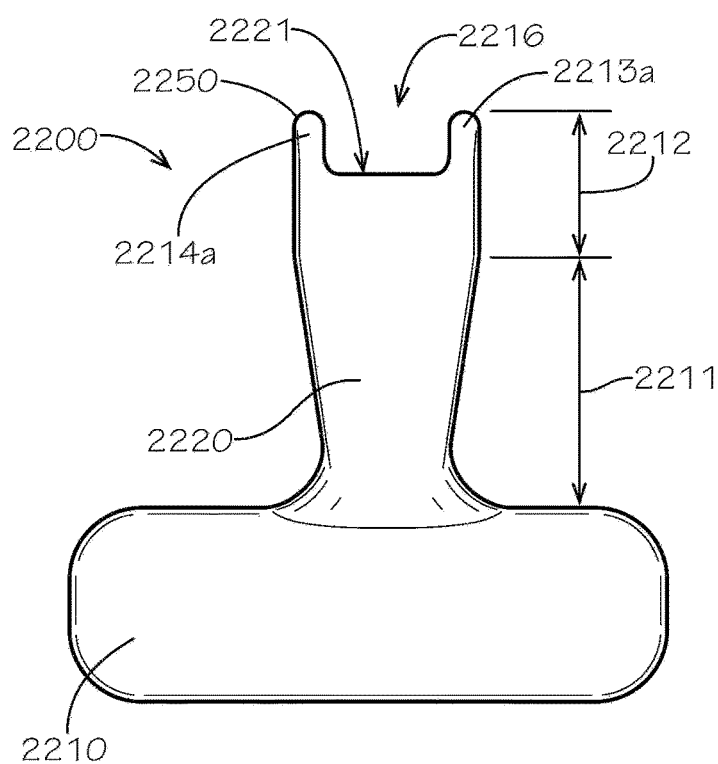
FIG. 22B is a side view of the installation tool of FIG. 22A.
Figure 22C:
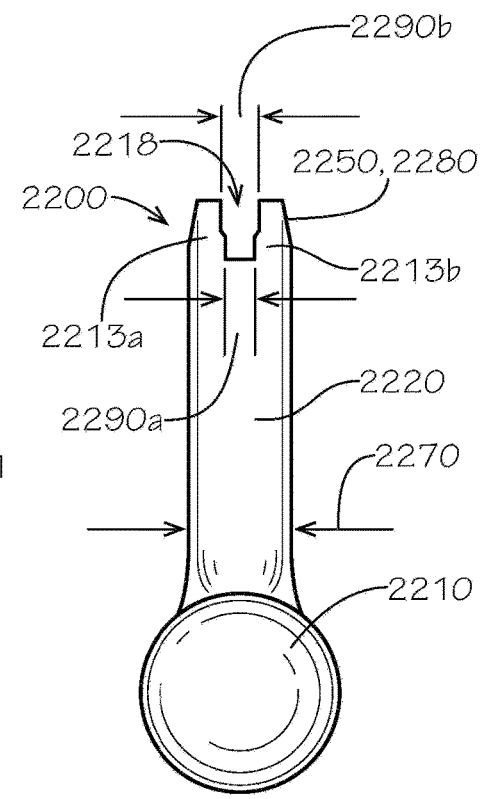
FIG. 22C is an end view of the installation tool of FIG. 22A.

FIGS. 22A-22C show the installation tool 2200 for assembling the assembly 1000 of FIG. 11 and, more specifically, for installing the suspender 600 (shown in FIG. 6) in the clip 100 (such as shown in FIG. 20A), with or without the cover 1010 (shown in FIG. 10) therebetween. As shown in FIG. 22A, which is a top perspective view of the installation tool 2200, the installation tool 2200 can comprise a handle 2210 and a shaft 2220 extending in the Z-axis direction from the handle 2210. The shaft 2220 can comprise a first portion 2211 defining side surfaces and a second portion 2212 defining side surfaces, a top surface 2221, and a tip 2250. The tip 2250 of the shaft 2220 can comprise first side portions 2213a,b and second side portions 2214a,b, which can define a forked tip 2250 defining a clip cavity 2216 (shown in FIG. 22B) and a suspender cavity 2218 (shown in FIG. 22C) therebetween sized to received, respectively, the clip 100 and the suspender 600. In some aspects, the central axis 2201 of the handle 2210 and the side portions 2213a,2214a and the side portions 2213b,2214b of the second portion 2212 can be aligned with the X-axis direction of the clip 100 when installing the clip 100. In some aspects, the tip 2250 of the shaft 2220 can define at least one of the clip cavity 2216, which can be specifically sized to receive a top end of the clip 100, and the suspender cavity 2218, which can be specifically sized to receive a top end of the suspender 600. For example and without limitation, the top end of the clip 100 and the suspender 600 can be defined by the tip 2250 of the clip 100 and the flange 620 of the suspender 600, respectively.

FIG. 22B is a side view of the installation tool 2200 of FIG. 22A. The first side portions 2213a,b (2213b shown in FIG. 22A) and the second portions 2214a,b (2214b shown in FIG. 22A) can straddle and the clip cavity 2216 can receive the distal ends 154a,b (shown in FIG. 20B) of the walls 150a,b (shown in FIG. 20B) of the clip 100 (shown in FIG. 20B) during installation of the suspender 600 (shown in FIG. 6) in the clip 100. The top surface 2221 can be recessed or offset from the tip 2250 of the shaft 2220 by a distance large enough to ensure that when the top surface 2221 bottoms out on the distal ends 154 of the walls 150a,b of the clip 100

(with or without the cover 1010 therebetween) the suspender 600 has been sufficiently inserted into and lockably engaged with the clip 100. At the same time, the top surface 2221 can be recessed or offset from the tip 2250 of the shaft 2220 by a distance small enough that when the top surface 2221 bottoms out on the distal ends 154 of the walls 150a,b of the clip 100 (again, with or without the cover 1010 therebetween) the suspender 600 will not have been pushed too far into the clip 100.

FIG. 22C is an end view of the installation tool 2200 of FIG. 22A. As shown, the shaft 2220 of the installation tool 2200 can define a shaft thickness 2270 in the X-axis direction, which can be constant up and down at least a portion of the shaft 2220. The suspender cavity 2218 can define a width 2290a proximate to the top surface 2221 and a width 2290b proximate to the tip 2250. As shown, the width 2290b can be greater than the width 2290a to accommodate the size and shape of the suspender 600 (shown in FIG. 6) with or without the cover 1010 (shown in FIG. 10). The first portions 2213a,b and the second portions 2214a,b (shown in FIG. 22A) can be tapered towards the tip 2250 and can define edge treatments.

Figure 23:
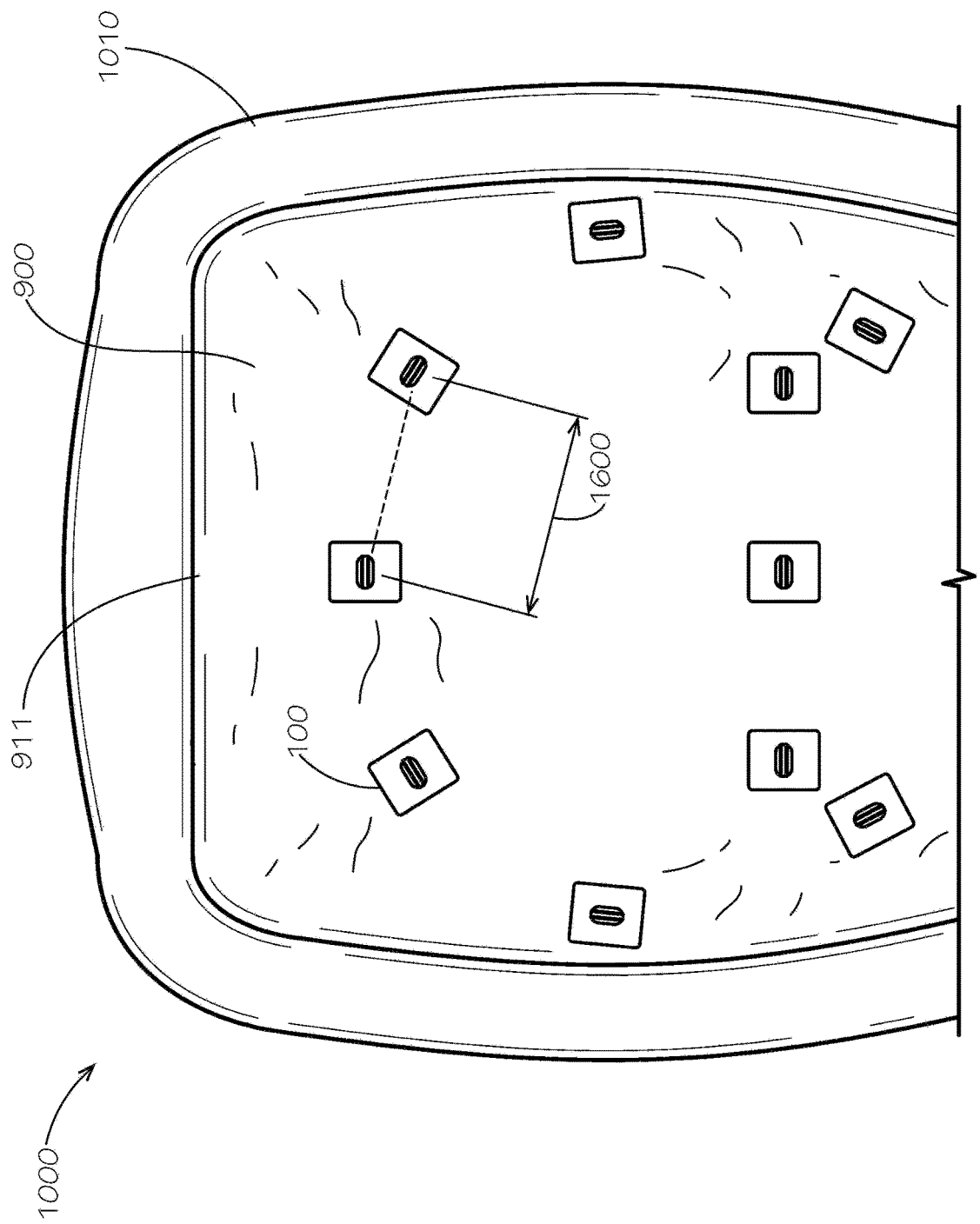
FIG. 23 is a bottom plan view of an assembly showing multiple aspects of the clip of FIG. 1.

FIG. 23 is a bottom plan view of the assembly 1000 showing a plurality of clips 100 in position against the lower surface 911 of the base 900. In various aspects, any number of clips 100 can be installed through the base 900 to secure the cover 1010. In some aspects, a certain number of clips 100 can be specified. In other aspects, a spacing 1600 between adjacent clips 100 can be specified. A greater number of clips 100 and a smaller spacing 1600 between adjacent clips 100 can in some aspects generally result in a better appearance. For example and without limitation, a spacing between the clips 100 can be set at approximately 5 millimeters minimum or at least the overall width of the clip 100 in the X-axis direction and typically will be approximately 100 millimeters, but any spacing that is physically possible can potentially be used. Each clip 100 of the plurality of clips 100 can extend through one of the plurality of openings 980 (shown in FIG. 9), and each of the plurality of clips 100 can be assembled to the suspender 600 (shown in FIG. 6).

Incorporating the features disclosed herein, including for example and without limitation one or more radii as shown (which can also improve insertion of the clip 100 into the base 900, the overall weight of the clip 100 can be reduced by as much as 75 percent or more. While the base 110 is shown as having one of various sizes and shapes, as noted above the base 110 can define any size and shape. As shown, the incorporation of various radii on one or more edges of the clip 100 can further reduce the weight of the clip 100.

The clip 100 can be made of any one of a number of deformable materials able to elastically deform to the degree described including, for example and without limitation, engineered polymers such as polyoxymethylene (POM), which is a type of acetal resin. The clip can be formed by an injection molding process but could conceivably be made from other processes such as, for example and without limitation, by an extruding process and/or a machining process. The base 900 itself can be made from any desirable material using a variety of processes, which in itself can be a significant benefit of the clip 100 not depending on the material of the base 900 but instead providing its own anchoring function.

A method of assembly can comprising obtaining the base 900 (shown in FIG. 9), which can define the lower surface 911 (shown in FIG. 9) and the upper surface 912 (shown in FIG. 9) and a plurality of openings 980 (shown in FIG. 9) extending from the lower surface 911 to the upper surface 912. The method can comprise inserting the clip 100 through one of the plurality of openings 980. The gap 168 (shown in FIG. 1) defined by the first latch nail 160a and the second latch nail 160b of the clip 100 can be configured to expand sufficiently to allow removal of the suspender 600 (shown in FIG. 6) upon insertion of the removal tool 1200 (shown, for example, in FIG. 12) between the first wall 150a and the second wall 150b. The method can comprise inserting the suspender 600 into the gap 168 of the clip 100. The step of inserting the suspender 600 can comprise pushing the suspender 600 into the gap 168 of the clip 100 with the installation tool 2200, which can comprise the shaft 2220. More specifically, in some aspects, inserting the suspender 600 into the gap 168 of the clip 100 can comprise pushing the suspender 600 into the gap 168 with panels or portions of the cover 1010 folded out of the way and with the installation tool 2200 contacting a portion of the suspender 600 such as the flange 620 (shown in FIG. 6) and/or the tape 670 (shown in FIG. 6). In such aspects, a user can guide the installation tool 2200 into mating contact with the suspender 600 at a position proximate to or even aligned with the clip 100. In other aspects, inserting the suspender 600 into the gap 168 of the clip 100 can comprise pushing the suspender 600 into the gap 168 with the cover 1010 positioned between the suspender 600 and the installation tool 2200.

The method can further comprise spreading apart the first wall 150a and the second wall 150b to increase the gap 168 therebetween. The method can further comprise removing the suspender 600 from the clip 100 without permanently deforming (i.e., permanently changing the basic shape of) either the clip 100 or the suspender 600. The step of spreading apart the first wall 150a and the second wall 150b can comprise inserting the removal tool 1200 through the cutout 380 defined in the base 110 of the clip 100 and into an expansion cavity 290 defined between the first wall 150a and the second wall 150b of the clip 100. The step of removing the suspender 600 can comprise contacting the suspender 600 with the removal tool 1200, which can define a tapered portion.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A clip for securing a cover to an opening defined in a base, the clip comprising:
   a base defining a lower surface and an upper surface distal from the lower surface, the base further defining a cutout extending from the lower surface to the upper surface;
   a first wall extending from the upper surface of the base of the clip and defining a first latch nail at a distal end of the first wall;
   a second wall extending from the upper surface of the base and defining a second latch nail at a distal end of the second wall, the first latch nail and the second latch nail defining a gap therebetween at the distal end of each of the first wall and the second wall, the cutout defined in the base between the first wall and the second wall; and
   fins respectively extending from the first wall and the second wall, wherein:
   the first wall and the second wall are arranged so as to face to each other, and
   the fins project outward with respect to a centerline axis of the clip and extend in a direction in which the first wall and the second wall face to each other.

2. The clip of claim 1, wherein a portion of one of the first wall and the second wall crosses a plane defined by an edge of the cutout and extending in a direction parallel to the centerline axis of the clip.

3. The clip of claim 1, wherein a minimum vertical material clearance distance defined between at least one of the fins and an upper surface of the base of the clip is equal to or less than 10 millimeters.

4. The clip of claim 1, wherein the base of the clip defines a recess in at least a first end and a second end of the clip.

5. The clip of claim 1, wherein the cutout defines an oblong shape.

6. The clip of claim 1, further comprising a pair of guide rails, a first guide rail of the pair of guide rails defined in the first wall and a second guide rail of the pair of guide rails defined in the second wall; the first latch nail, the second latch nail, the first guide rail, and the second guide rail defining a suspender retention cavity.

7. The clip of claim 1, wherein a lower surface of a first base member of the base of the clip is offset vertically from a lower surface of a second base member of the base of the clip by an offset distance.

8. The clip of claim 1, wherein a thickness of each the first wall and the second wall is greater proximate to a proximal end of each of the first wall and the second wall, respectively, than a thickness of the corresponding wall proximate to a distal end of the corresponding wall.

9. The clip of claim 1, wherein the cutout is defined between a first end and a second end of the clip without defining either of the first end or the second end.

* * * * *